(12) United States Patent
Ito et al.

(10) Patent No.: US 6,694,056 B1
(45) Date of Patent: Feb. 17, 2004

(54) CHARACTER INPUT APPARATUS/METHOD AND COMPUTER-READABLE STORAGE MEDIUM

(75) Inventors: Yoshikatsu Ito, Hirakata (JP); Ichiro Nakao, Amagasaki (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 624 days.

(21) Appl. No.: 09/686,968

(22) Filed: Oct. 12, 2000

(30) Foreign Application Priority Data

Oct. 15, 1999 (JP) .............................. 11-294149

(51) Int. Cl.[7] .............................. G06K 9/00; G06K 9/68
(52) U.S. Cl. .................... 382/186; 382/187; 382/218
(58) Field of Search .............................. 382/185, 186, 382/187, 188, 189, 209, 217, 218

(56) References Cited

U.S. PATENT DOCUMENTS

| 4,860,372 A | | 8/1989 | Kuzunuki et al. | |
|---|---|---|---|---|
| 5,426,711 A | * | 6/1995 | Kitamura | 382/187 |
| 5,732,154 A | * | 3/1998 | Dai | 382/197 |
| 5,734,750 A | * | 3/1998 | Arai et al. | 382/202 |
| 5,745,599 A | * | 4/1998 | Uchiyama et al. | 382/217 |
| 6,035,063 A | * | 3/2000 | Nakashima et al. | 382/187 |
| 6,094,506 A | * | 7/2000 | Hullender | 382/186 |
| 6,212,298 B1 | * | 4/2001 | Yoshii et al. | 382/193 |

FOREIGN PATENT DOCUMENTS

JP 7-168914 7/1995

OTHER PUBLICATIONS

Wakahara et al. "On–Line Handwriting Recognition." Proc. of the IEEE, vol. 80, No. 7, Jul. 1992, pp. 1181–1194.*

* cited by examiner

Primary Examiner—Jon Chang
(74) Attorney, Agent, or Firm—Wenderoth, Lind & Ponack, L.L.P.

(57) ABSTRACT

A character input apparatus accurately recognizes handwritten characters drawn one after another in a single input frame. A stroke matching unit obtains stroke information for each stroke in the inputted handwritten characters from the start/end area of the stroke in the input frame and the direction of the stroke, and detects stroke candidates for the stroke by comparing the stroke information with each set of stroke information in the stroke dictionary. An interval-based character detecting unit detects character candidates from detected stroke candidates by referring to the character dictionary that stores an stroke order for each character. With this construction, the apparatus is capable of accurately recognizing a plurality of characters drawn one after another in a single input frame.

16 Claims, 49 Drawing Sheets

FIG. 3

STROKE DICTIONARY 101

| STROKE NUMBER | START AREA | END AREA | NUMBER OF DIRECTIONS | DIRECTION 1 | DIRECTION 2 | DIRECTION 3 |
|---|---|---|---|---|---|---|
| s0 | a00 | a03 | 1 | d0 | | |
| s1 | a10 | a13 | 1 | d0 | | |
| s2 | a01 | a33 | 2 | d12 | d0 | |
| s3 | a02 | a31 | 2 | d12 | d10 | |
| s4 | a01 | a23 | 2 | d12 | d2 | |
| s5 | a11 | a30 | 1 | d11 | | |
| s6 | a00 | a30 | 2 | d0 | d10 | |
| s7 | a22 | a33 | 1 | d14 | | |
| s8 | a00 | a21 | 2 | d0 | d10 | |
| s9 | a21 | a32 | 1 | d15 | | |

FIG. 7

CHARACTER DICTIONARY 102

| CHARACTER NUMBER | CHARACTER | NUMBER OF STROKES | STROKE 1 | STROKE 2 | STROKE 3 |
|---|---|---|---|---|---|
| c0 | モ | 3 | s0 | s1 | s2 |
| c1 | 一 | 1 | s1 | | |
| c2 | ノ | 1 | s3 | | |
| c3 | レ | 1 | s4 | | |
| c4 | ル | 2 | s5 | s4 | |
| c5 | ７ | 1 | s6 | | |
| c6 | ス | 2 | s6 | s7 | |
| c7 | マ | 2 | s8 | s9 | |

702 703 704 705

WORD DICTIONARY 103

| WORD NUMBER | NUMBER OF CHARACTERS | CHARACTER 1 | CHARACTER 2 | CHARACTER 3 | CHARACTER 4 | CHARACTER 5 |
|---|---|---|---|---|---|---|
| w0 | 4 | ス | モ | ー | ル | |
| w1 | 3 | ノ | ル | マ | | |
| w2 | 3 | フ | ス | マ | | |
| w3 | 4 | フ | ル | モ | ノ | |
| w4 | 5 | モ | ノ | レ | ー | ル |

FIG. 11

| STROKE | START AREA | END AREA | NUMBER OF DIRECTIONS | DIRECTION 1 | DIRECTION 1 | DIRECTION 1 |
|---|---|---|---|---|---|---|
| i1000 | a00 | a03 | 1 | d0 | | |
| i1001 | a10 | a13 | 1 | d0 | | |
| i1002 | a01 | a33 | 2 | d12 | d15 | |
| i1003 | a02 | a31 | 1 | d11 | | |
| i1004 | a02 | a23 | 2 | d11 | d1 | |
| i1005 | a10 | a13 | 1 | d0 | | |
| i1006 | a11 | a30 | 1 | d11 | | |
| i1007 | a01 | a23 | 2 | d13 | d1 | |

FIG.12

| STROKE CANDIDATE | i1000 | i1001 | i1002 | i1003 | i1004 | i1005 | i1006 | i1007 |
|---|---|---|---|---|---|---|---|---|
| sc0 | s0(0) | s1(0) | s2(1) | s3(2) | s4(3) | s1(0) | s5(0) | s4(2) |
| sc1 | s1(2) | s0(2) | s4(5) | s5(4) | s2(4) | s0(2) | s3(6) | s2(3) |
| sc2 | s4(14) | s9(11) | s9(8) | s7(10) | s7(12) | s9(11) | s9(12) | s1(9) |
| sc3 | s2(16) | s7(12) | s7(10) | s9(16) | s9(20) | s7(12) | s7(14) | s0(9) |
| sc4 | s9(23) | s4(14) | s1(15) | s6(21) | s0(23) | s4(14) | s6(20) | s9(10) |

FIG.13

| STROKE | START WRITING | END WRITING |
|---|---|---|
| i1000 | 0.00 | 0.14 |
| i1001 | 0.27 | 0.40 |
| i1002 | 0.55 | 0.78 |
| i1003 | 0.95 | 1.11 |
| i1004 | 1.50 | 1.72 |
| i1005 | 1.91 | 2.05 |
| i1006 | 2.20 | 2.32 |
| i1007 | 2.44 | 2.57 |

FIG.14

| CHARACTER CANDIDATE | i1000 | i1001 | i1002 | i1003 | i1004 | i1005 | i1006 | i1007 |
|---|---|---|---|---|---|---|---|---|
| cc0 | | c0(モ) | | c2(ノ) | c3(レ) | c1(一) | c4(ルレ) | |
| cc1 | c1(一) | c1(一) | c3(レ) | | | | c2(ノ) | c3(レ) |
| cc2 | | | | | | | | c1(一) |

FIG. 19

| STROKE | START AREA | END AREA | NUMBER OF DIRECTIONS | DIRECTION 1 | DIRECTION 2 | DIRECTION 3 |
|---|---|---|---|---|---|---|
| i1800 | a00 | a13 | 3 | d0 | d9 | d0 |
| i1801 | a01 | a33 | 2 | d12 | d0 | |

| STROKE CANDIDATE | i1800 | i1801 |
|---|---|---|
| sc0 | s4(16) | s2(0) |
| sc1 | s2(16) | s4(3) |
| sc2 | s7(38) | s9(9) |
| sc3 | s8(40) | s7(11) |
| sc4 | s9(48) | s1(14) |

FIG. 21

STROKE DICTIONARY 1703

| STROKE NUMBER | START AREA | END AREA | NUMBER OF DIRECTIONS | DIRECTION 1 | DIRECTION 2 | DIRECTION 3 |
|---|---|---|---|---|---|---|
| s0 | a00 | a03 | 1 | d0 | | |
| s1 | a10 | a13 | 1 | d0 | | |
| s2 | a01 | a33 | 2 | d12 | d0 | |
| s3 | a02 | a31 | 2 | d12 | d10 | |
| s4 | a01 | a23 | 2 | d12 | d2 | |
| s5 | a11 | a30 | 1 | d11 | | |
| s6 | a00 | a30 | 2 | d0 | d10 | |
| s7 | a22 | a33 | 1 | d14 | | |
| s8 | a00 | a21 | 2 | d0 | d10 | |
| s9 | a21 | a32 | 1 | d15 | | |
| s10 | a00 | a13 | 3 | d0 | d9 | d0 |

FIG. 22

CHARACTER DICTIONARY 1705

| CHARACTER NUMBER | CHARACTER | NUMBER OF STROKES | STROKE 1 | STROKE 2 | STROKE 3 |
|---|---|---|---|---|---|
| c0 | 王 | 3 | s0 | s1 | s2 |
| c1 | 一 | 1 | s1 | | |
| c2 | ノ | 1 | s3 | | |
| c3 | レ | 1 | s4 | | |
| c4 | ル | 2 | s5 | s4 | |
| c5 | フ | 1 | s6 | | |
| c6 | ス | 2 | s6 | s7 | |
| c7 | マ | 2 | s8 | s9 | |
| c8 | モ | 2 | s10 | s2 | |

FIG. 24

| STROKE | START AREA | END AREA | NUMBER OF DIRECTIONS | DIRECTION 1 | DIRECTION 2 | DIRECTION 3 |
|---|---|---|---|---|---|---|
| i2300 | a00 | a13 | 3 | d0 | d10 | d1 |
| i2301 | a01 | a33 | 2 | d12 | d15 | |
| i2302 | a02 | a31 | 1 | d11 | | |
| i2303 | a02 | a23 | 2 | d11 | d1 | |
| i2304 | a10 | a13 | 1 | d0 | | |
| i2305 | a11 | a30 | 1 | d11 | | |
| i2306 | a01 | a23 | 2 | d13 | d1 | |

FIG. 25

| STROKE CANDIDATE | i2300 | i2301 | i2302 | i2303 | i2304 | i2305 | i2306 |
|---|---|---|---|---|---|---|---|
| sc0 | s10(2) | s2(1) | s3(2) | s4(3) | s1(0) | s5(0) | s4(2) |
| sc1 | s4(13) | s4(5) | s5(4) | s2(4) | s0(2) | s3(6) | s2(3) |
| sc2 | s2(15) | s9(8) | s7(10) | s7(12) | s9(11) | s9(12) | s1(9) |
| sc3 | s7(32) | s7(10) | s9(16) | s9(20) | s7(12) | s7(14) | s0(9) |
| sc4 | s9(33) | s1(15) | s6(21) | s0(23) | s4(14) | s6(20) | s9(10) |

FIG.26

| STROKE | START WRITING | END WRITING |
|---|---|---|
| i2300 | 0.00 | 0.30 |
| i2301 | 0.45 | 0.68 |
| i2302 | 0.85 | 1.01 |
| i2303 | 1.40 | 1.62 |
| i2304 | 1.81 | 1.95 |
| i2305 | 2.10 | 2.22 |
| i2306 | 2.34 | 2.47 |

FIG. 27

| CHARACTER CANDIDATE | i2300 | i2301 | i2302 | i2303 | i2304 | i2305 | i2306 |
|---|---|---|---|---|---|---|---|
| cc0 | c8(モ) | | c2(ノ) | c3(レ) | c1(一) | c4(ル) | |
| cc1 | | c3(レ) | | | | c2(ノ) | c3(レ) |
| cc2 | | | | | | | c1(一) |

| STROKE NUMBER | FIRST FLAG | START AREA | END AREA | NUMBER OF DIRECTIONS | DIRECTION 1 | DIRECTION 2 | DIRECTION 3 |
|---|---|---|---|---|---|---|---|
| s0 | 1 | a00 | a03 | 1 | d0 | | |
| s1 | 1 | a10 | a13 | 1 | d0 | | |
| s2 | 0 | a01 | a33 | 2 | d12 | d0 | |
| s3 | 1 | a02 | a31 | 2 | d12 | d10 | |
| s4 | 1 | a01 | a23 | 2 | d12 | d2 | |
| s5 | 1 | a11 | a30 | 1 | d11 | | |
| s6 | 1 | a00 | a30 | 2 | d0 | d10 | |
| s7 | 0 | a22 | a33 | 1 | d14 | | |
| s8 | 1 | a00 | a21 | 2 | d0 | d10 | |
| s9 | 0 | a21 | a32 | 1 | d15 | | |

FIG.32

| FORMER CHARACTER | モ | ー | ノ | レ | ル | フ | ス | マ |
|---|---|---|---|---|---|---|---|---|
| モ | 4 | 8 | 12 | 4 | 4 | 4 | 4 | 4 |
| ー | 4 | 0 | 4 | 4 | 12 | 4 | 4 | 4 |
| ノ | 4 | 4 | 4 | 8 | 8 | 4 | 4 | 4 |
| レ | 4 | 8 | 4 | 4 | 4 | 4 | 4 | 4 |
| ル | 4 | 4 | 4 | 4 | 4 | 4 | 4 | 8 |
| フ | 4 | 4 | 4 | 4 | 8 | 4 | 8 | 4 |
| ス | 8 | 4 | 4 | 4 | 4 | 4 | 4 | 4 |
| マ | 4 | 4 | 4 | 4 | 4 | 4 | 4 | 8 |
| NONE | 8 | 0 | 8 | 4 | 4 | 12 | 8 | 4 |

FIG. 39

| STROKE | START AREA | END AREA | NUMBER OF DIRECTIONS | DIRECTION 1 | DIRECTION 2 | DIRECTION 3 |
|---|---|---|---|---|---|---|
| i3800 | a00 | a31 | 2 | d0 | d11 | |
| i3801 | a00 | a30 | 2 | d1 | d10 | |
| i3802 | a22 | a33 | 1 | d15 | | |
| i3803 | a10 | a31 | 2 | d1 | d11 | |
| i3804 | a21 | a33 | 1 | d15 | | |

| STROKE CANDIDATE | i3800 | i3801 | i3802 | i3803 | i3804 |
|---|---|---|---|---|---|
| sc0 | s6(2) | s6(1) | s7(1) | s6(4) | s9(1) |
| sc1 | s8(2) | s8(4) | s9(2) | s8(4) | s7(2) |
| sc2 | s3(12) | s3(20) | s1(11) | s9(14) | s2(8) |
| sc3 | s9(17) | s9(28) | s2(12) | s7(18) | s5(8) |
| sc4 | s5(20) | s7(34) | s4(16) | s3(24) | s1(10) |

| OFF STROKE | STROKE1 | STROKE2 | 方向 |
|---|---|---|---|
| o4100 | i3800 | i3801 | d5 |
| o4101 | i3801 | i3802 | d1 |
| o4102 | i3802 | i3803 | d7 |
| o4103 | i3803 | i3804 | d6 |

FIG.42

| CHARACTER CANDIDATE | i2900 | i2901 | i2902 | i2903 | i2904 |
|---|---|---|---|---|---|
| cc0 | c5(フ) | c5(フ) |  | c5(フ) | c1(一) |
| cc1 |  | c6(ス) |  | c7(マ) |  |
| cc2 |  |  |  |  |  |

FIG.45

STROKE DICTORY 4501

| STROKE NUMBER 4502 | START AREA 4503 | END AREA 4504 | NUMBER OF DIRECTIONS 4506 | DIRECTION 1 | DIRECTION 2 | DIRECTION 3 | DIRECTION 4 |
|---|---|---|---|---|---|---|---|
| s0 | a00 | a30 | 1 | d12 | | | |
| s1 | a00 | a10 | 4 | d15 | d13 | d11 | d9 |
| s2 | a11 | a33 | 1 | d14 | | | |
| s3 | a01 | a31 | 1 | d12 | | | |
| s4 | a00 | a30 | 4 | d15 | d13 | d11 | d9 |
| s5 | a00 | a03 | 1 | d0 | | | |
| s6 | a10 | a13 | 1 | d0 | | | |
| s7 | a30 | a33 | 1 | d0 | | | |

CHARACTER DICTIONARY 4701

| CHARACTER NUMBER | CHARACTER | NUMBER OF STROKES | STROKE 1 | STROKE 2 | STROKE 3 | STROKE 4 |
|---|---|---|---|---|---|---|
| c0 | D | 2 | s0 | s4 | | |
| c1 | E | 4 | s5 | s0 | s6 | s7 |
| c2 | F | 3 | s5 | s0 | s6 | |
| c3 | I | 1 | s3 | | | |
| c4 | P | 2 | s0 | s1 | | |
| c5 | R | 3 | s0 | s1 | s2 | |

WORD DICTIONARY

| WORD NUMBER | NUMBER OF CHARACTERS | CHARACTER 1 | CHARACTER 2 | CHARACTER 3 | CHARACTER 4 |
|---|---|---|---|---|---|
| w0 | 3 | D | R | I | P |
| w1 | 4 | F | I | R | E |
| w2 | 3 | P | I | E | |

| STROKE | START AREA | END AREA | NUMBER OF DIRECTIONS | DIRECTION 1 | DIRECTION 1 | DIRECTION 1 | DIRECTION 1 | DIRECTION 1 |
|---|---|---|---|---|---|---|---|---|
| i5000 | a10 | a03 | 1 | d1 | | | | |
| i5001 | a10 | a30 | 1 | d12 | | | | |
| i5002 | a20 | a12 | 1 | d1 | | | | |
| i5003 | a02 | a31 | 1 | d11 | | | | |
| i5004 | a00 | a30 | 1 | d11 | | | | |
| i5005 | a01 | a21 | 3 | d15 | d13 | d9 | | |
| i5006 | a22 | a33 | 1 | d14 | | | | |
| i5007 | a00 | a03 | 1 | d1 | | | | |
| i5008 | a00 | a30 | 1 | d11 | | | | |
| i5009 | a10 | a13 | 1 | d0 | | | | |
| i5010 | a30 | a33 | 1 | d0 | | | | |

FIG.52

| STROKE CANDIDATE | i5000 | i5001 | i5002 | i5003 | i5004 | i5005 | i5006 | i5007 | i5008 | i5009 | i5010 |
|---|---|---|---|---|---|---|---|---|---|---|---|
| sc0 | s6 (2) | s0 (1) | s6 (3) | s3 (2) | s0 (1) | s4 (6) | s2 (3) | s5 (1) | s0 (1) | s6 (0) | s7 (0) |
| sc1 | s5 (2) | s3 (4) | s5 (7) | s0 (5) | s3 (3) | s1 (6) | s7 (9) | s6 (3) | s3 (3) | s5 (2) | s6 (6) |
| sc2 | s7 (11) | s2 (10) | s7 (9) | s2 (10) | s4 (12) | s3 (10) | s6 (12) | s2 (14) | s4 (12) | s7 (6) | s2 (9) |
| sc3 | s2 (12) | s4 (11) | s2 (14) | s4 (16) | s2 (14) | s0 (13) | s3 (12) | s7 (15) | s2 (14) | s2 (6) | s5 (14) |
| sc4 | s3 (50) | s1 (14) | s3 (30) | s1 (22) | s1 (15) | s2 (26) | s0 (24) | s3 (48) | s1 (15) | s3 (26) | s0 (22) |

FIG.53

| CHARACTER CANDIDATE | i5000 | i5001 | i5002 | i5003 | i5004 | i5005 | i5006 | i5007 | i5008 | i5009 | i5010 |
|---|---|---|---|---|---|---|---|---|---|---|---|
| cc0 | | c2(F) | | c3(I) | c0(D) | | | | c1(E) | | |
| cc1 | | | | | c4(P) | | | c2(F) | | | |
| cc2 | | | | | | c6(R) | | | | | |
| cc3 | | | | | c3(I) | | | c3(I) | | | |

CHARACTER INPUT APPARATUS/METHOD AND COMPUTER-READABLE STORAGE MEDIUM

This application is based on an application No. H11-294149 filed in Japan, the content of which is hereby incorporated by reference.

BACKGROUND OF THE INVENTION

1. Field of the Invention

The present invention relates to a character input apparatus capable of recognizing handwritten characters, a method for inputting such characters, and a computer-readable storage medium for storing programs that can recognize handwritten characters. In particular, the invention relates to a character input apparatus and a method that are suited to the recognition of characters that are drawn one after another in a single character input frame, as well as to a computer-readable storage medium storing a program that enables a computer to execute this method.

2. Description of the Prior Art

To input handwritten characters into a portable information terminal, a user handwrites characters using a stylus in a character input frame provided on a digitizer. For example, Japanese Laid-Open Patent Application No. 7-168914 discloses a technology that has a user input characters in a number of character input frames provided on a screen. These characters are transferred and recognized without the user having to make any special operations.

Another technology is "GRAFFITI" (a registered trademark of 3Com Corp.) for inputting special one-stroke characters.

However, when characters are written into a plurality of character input frames, a user has to move his/her hand with a stylus to a next frame every time he/she inputs a character, which takes time and makes it difficult for the user to write characters neatly. This prevents a user from inputting handwritten characters efficiently.

A large space is required to provide a plurality of character input frames, which makes it difficult to realize this method on a compact apparatus such as a portable information terminal or a portable telephone.

While it would be ideal for compact portable information terminals to use a tablet as a single character input frame, it is difficult to judge when there is a break between inputted characters. In order to clarify the breaks, the conventional way has been to equip an apparatus with a conversion button that a user presses after drawing each character. This prevents the user from writing naturally.

When characters are written using special one-stroke characters with "GRAFFITI", users have to learn a special writing system, which provides an obstacle for anyone wishing to use the apparatus.

SUMMARY OF THE INVENTION

In view of the above problems, the present invention aims to provide a character input apparatus and method for realizing accurate recognition of inputted handwritten characters that are drawn one after another in a single character input frame by a user, without requiring the user to learn a special writing system, and a computer-readable storage medium for storing a program that makes a computer execute this method.

The above object can be achieved by a character input apparatus comprising: a stroke dictionary in which sets of standard stroke information for a plurality of strokes are registered, each set of standard stroke information corresponding to a different stroke; a character dictionary in which stroke orders for a plurality of characters are registered, each stroke order corresponding to a different character; a coordinate output unit operable to output, when a user inputs handwritten characters, a coordinate string, that is sets of coordinates of points, for each handwritten stroke composing the handwritten characters; a stroke matching unit operable to obtain stroke information for each handwritten stroke from the outputted coordinate string of the handwritten stroke, compare the stroke information with each set of standard stroke information registered in the stroke dictionary, and output stroke candidates; and a character detecting unit operable to search the character dictionary using an order of a group of stroke candidates obtained in inputted order by the stroke matching unit as a key and detect a character whose stroke order matches the order of the stroke candidates. With this construction, the apparatus is capable of detecting correct characters for handwritten characters drawn one after another in a single character input frame.

Here, the standard stroke information includes a start position, an end position, each direction, and number of directions for each stroke, and wherein the stroke matching unit comprises: a stroke information obtaining unit operable to obtain stroke information which includes a start position, an end position, each direction, and number of directions for a stroke from the coordinate string of the stroke; a stroke candidate output unit operable to compare the obtained stroke information with each set of standard stroke information and output a plurality of stroke candidates; and an evaluation value adding unit operable to add an evaluation value to each stroke candidate according to a degree of matching between the obtained stroke information and the standard stroke information of the stroke candidate, and wherein the character detecting unit comprises: a character candidate detecting unit operable to ignore stroke candidates with the evaluation value showing a poor match and detect character candidates using the remaining stroke candidates; and a correct character detecting unit operable to detect a correct character out of the detected character candidates. With this construction, stroke candidates with low recognition level are ignored in a process of detecting character candidates, which increases efficiency for the detecting of character candidates.

Here, the character input apparatus further comprises, a coordinate string detecting unit operable to detect coordinate strings, out of the coordinate strings outputted by the coordinate output unit, that are inputted at least a predetermined time after an immediately preceding coordinate string, wherein the character candidate detecting unit detects character candidates by setting the stroke candidates corresponding to the coordinate strings detected by the coordinate string detecting unit as first strokes of characters. With this construction, recognition mistake of a stroke of a handwritten character for a stroke that constitutes a different character is prevented.

Here, the correct character detecting unit in the character input apparatus comprises a word dictionary in which character orders for a plurality of words are registered, each character order corresponding to a different word; and a word detecting unit operable to detect, when (a) a character candidate detected by the character candidate detecting unit or (b) a combination of character candidates is registered in the word dictionary, the corresponding word as inputted handwritten characters. With this construction, the apparatus is capable of recognizing inputted handwritten characters as correct words in the word dictionary.

Here, the correct character detecting unit in the character input apparatus comprises: a probability dictionary for showing a numeric value of the probability of each pair of adjacent characters appearing in a character string; a high probability character detecting unit operable to generate character strings by combining character candidates detected by the character candidate detecting unit without changing an order of the character candidates, calculate a value for each character string by summing up the numeric values of the probability for pairs of adjacent characters that constitute a character string and dividing the sum by the number of characters that constitute the character string, and detect a character string with the highest value as inputted handwritten characters. With this construction, handwritten characters are recognized based on the probability of characters appearing before/after other characters. Therefore, the apparatus is also capable of recognizing characters that are not registered in the word dictionary.

Here, the mode of the character input apparatus can be set to learning mode for learning handwritten characters, wherein when the character input apparatus is in learning mode, the stroke matching unit adds an evaluation value to each stroke candidate according to a degree of matching between the obtained stroke information and the standard stroke information of the stroke candidate registered in the stroke dictionary, and wherein the character input apparatus further includes: a stroke dictionary additional register unit operable to additionally register, when an evaluation value for a stroke candidate is smaller than a predetermined evaluation value which shows a poor match, stroke information for the stroke candidate as standard stroke information in the stroke dictionary; and a character dictionary additional register unit operable to additionally register a stroke order that includes the above stroke candidate for a character to be learned in the character dictionary. With this construction, the apparatus is capable of accurately recognizing a user's unique handwritten characters.

Here, the stroke dictionary stores standard stroke information together with a flag that indicates whether each stroke has the possibility of being a first stroke of a character, and the stroke matching unit compares stroke information obtained from a first coordinate string outputted by the coordinate output unit only with stroke information having a flag that indicates a first stroke in the stroke dictionary. With this construction, the matching of pairs of stroke information can be performed with high speed and accuracy.

Here, the character input apparatus further comprises, a coordinate string detecting unit operable to detect coordinate strings, out of the coordinate strings outputted by the coordinate output unit, that are inputted at least a predetermined time after an immediately preceding coordinate string, wherein the stroke dictionary stores standard stroke information together with a flag that indicates whether each stroke has the possibility of being a first stroke of a character, and the stroke matching unit compares stroke information obtained from a first coordinate string outputted by the coordinate output unit only with stroke information having a flag that indicates a first stroke in the stroke dictionary. With this construction, the matching of pairs of stroke information can be performed with high speed and accuracy.

Here, the stroke matching unit comprises: an overlap detecting unit operable to detect from a coordinate string outputted by the coordinate output unit whether a stroke has a line segment that partially or completely overlaps a stroke preceding the stroke, and if the overlap detecting unit detects overlapping strokes, the character detecting unit treats the latter of the overlapping strokes belonging to a different character to the former stroke. With this construction, the apparatus is capable of choosing stroke candidates for each of handwritten characters drawn one after another in a single character input frame without any mistakes, which prevents the apparatus from recognizing characters wrongly and realizes high speed character recognition.

Here, the character input apparatus further comprises, an off-stroke information detecting unit operable to detect off-stroke information from the end point of one coordinate string and the start point of a following coordinate string outputted by the coordinate output unit, wherein the character dictionary further stores, when a character is composed of a plurality of strokes, off-stroke information that shows the relationship between the end point of one stroke and the start point of a following stroke, and wherein when the character detecting unit detects characters from stroke candidates outputted by the stroke matching unit, if off-stroke information detected by the off-stroke information detecting unit differs from the corresponding off-stroke information of a character registered in the character dictionary by at least a predetermined amount, the character detecting unit does not detect the character. With this construction, the apparatus is capable of distinguishing characters with similar stroke information and accurately recognizing characters using off-stroke information between strokes.

Here, the character detecting unit in the character input apparatus comprises: a character candidate detecting unit operable to detect a plurality of character candidates; and a shortest character string detecting unit operable to generate character strings by combining character candidates detected by the character candidate detecting unit without changing an order of the character candidates and detect a character string which has the smallest number of characters as inputted handwritten characters. With this construction, the apparatus is capable of correctly recognizing handwritten characters without being equipped with a special word dictionary and the like.

The object of the present invention can also be achieved by a character input method comprising: a coordinate output step for outputting, when a user inputs handwritten characters, a coordinate string, that is sets of coordinates of points, for each handwritten stroke composing the handwritten characters; a stroke matching step for obtaining stroke information for each handwritten stroke from the outputted coordinate string of the handwritten stroke, comparing the stroke information with each set of standard stroke information registered in the stroke dictionary, and outputting stroke candidates; and a character detecting step for browsing orders of strokes for characters registered in the character dictionary using an order of a group of stroke candidates obtained in inputted order in the stroke matching step as a key and detecting a character whose stroke order matches the order of the stroke candidates. With this construction, the apparatus is capable of detecting correct characters for handwritten characters drawn one after another in a single character input frame.

The object of the present invention can further be achieved by a computer-readable storage medium which stores a program for making a computer perform following steps, the storage medium storing (a) a stroke dictionary in which sets of standard stroke information for a plurality of strokes are registered, each set of standard stroke information corresponding to a different stroke, and (b) a character dictionary in which stroke orders for a plurality of characters are registered, each stroke order corresponding to a different character, the program comprising: a coordinate output step for outputting, when a user inputs handwritten characters, a coordinate string, that is sets of coordinates of points, for each handwritten stroke composing the handwritten characters; a stroke matching step for obtaining stroke information for each handwritten stroke from the outputted coordinate string of the handwritten stroke, comparing the stroke information with each set of stroke information registered in the stroke dictionary, and outputting stroke candidates; and a character detecting step for searching the character dictionary using an order of a group of stroke candidates obtained in inputted order in the stroke matching step as a key, and detecting a character whose stroke order matches the order of the stroke candidates. By applying the storage medium that stores such programs to a character input apparatus without functions to recognize handwritten characters drawn one after another in a single input frame, the character input apparatus will be able to detect correct characters as handwritten characters.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 shows an example of the content of a stroke dictionary in the above embodiment.

FIG. 7 shows an example of the content of a character dictionary in the above embodiment.

FIG. 11 shows stroke information for coordinate strings outputted by the coordinate input unit obtained by a stroke matching unit in the above embodiment.

FIG. 12 shows stroke candidates for the strokes shown in FIG. 10 obtained by the stroke matching unit in the above embodiment.

FIG. 13 shows the time when a user starts/ends writing each stroke kept by an interval detecting unit in the above embodiment.

FIG. 14 shows character candidates for the stroke candidates shown in FIG. 12 detected by the interval-based character detecting unit in the above embodiment.

FIG. 19 shows stroke information obtained for the strokes shown in FIG. 18 in the above embodiment.

FIG. 20 shows outputted stroke candidates selected by matching the stroke information obtained in the above embodiment with each set of stroke information in an existing stroke dictionary.

FIG. 21 shows an example of the content of a stroke dictionary that includes stroke information newly registered by a custom stroke dictionary register unit in the above embodiment.

FIG. 22 shows an example of the content of a character dictionary that includes characters newly registered by a custom character dictionary register unit in the above embodiment.

FIG. 24 shows stroke information for coordinate strings outputted by the coordinate input unit obtained by a stroke matching unit in the above embodiment.

FIG. 25 shows stroke candidates for the strokes shown in FIG. 23 obtained by the stroke matching unit in the above embodiment.

FIG. 26 shows the time a user starts/ends writing each stroke kept by an interval detecting unit in the above embodiment.

FIG. 27 shows character candidates for the stroke candidates shown in FIG. 25 detected by the interval-based character detecting unit in the above embodiment.

FIG. 32 shows an example of the content of a probability dictionary in the above embodiment.

FIG. 39 shows stroke information for coordinate strings outputted by the coordinate input unit obtained by a stroke matching unit in the above embodiment.

FIG. 40 shows stroke candidates for the strokes shown in FIG. 38 obtained by the stroke matching unit in the above embodiment.

FIG. 41 shows off-stroke information detected by an off-stroke detecting unit in the above embodiment.

FIG. 42 shows character candidates for the stroke candidates shown in FIG. 40 detected by an off-stroke verification-based character detecting unit in the above embodiment.

FIG. 45 shows an example of the content of a stroke dictionary in the fifth embodiment of the present invention.

FIG. 47 shows an example of the content of a character dictionary in the above embodiment.

FIG. 49 shows an example of the content of a word dictionary in the above embodiment.

FIG. 51 shows stroke information for coordinate strings outputted by the coordinate input unit obtained by a stroke matching unit in the above embodiment.

FIG. 52 shows stroke candidates for the strokes shown in FIG. 50 obtained by the stroke matching unit in the above embodiment.

FIG. 53 shows character candidates for the stroke candidates shown in FIG. 52 detected by an interval-based character detecting unit in the above embodiment.

DESCRIPTION OF THE PREFERRED EMBODIMENTS

The following is an explanation of several embodiments of a character input apparatus relating to the present invention with reference to drawings.

First Embodiment

Figure 1:
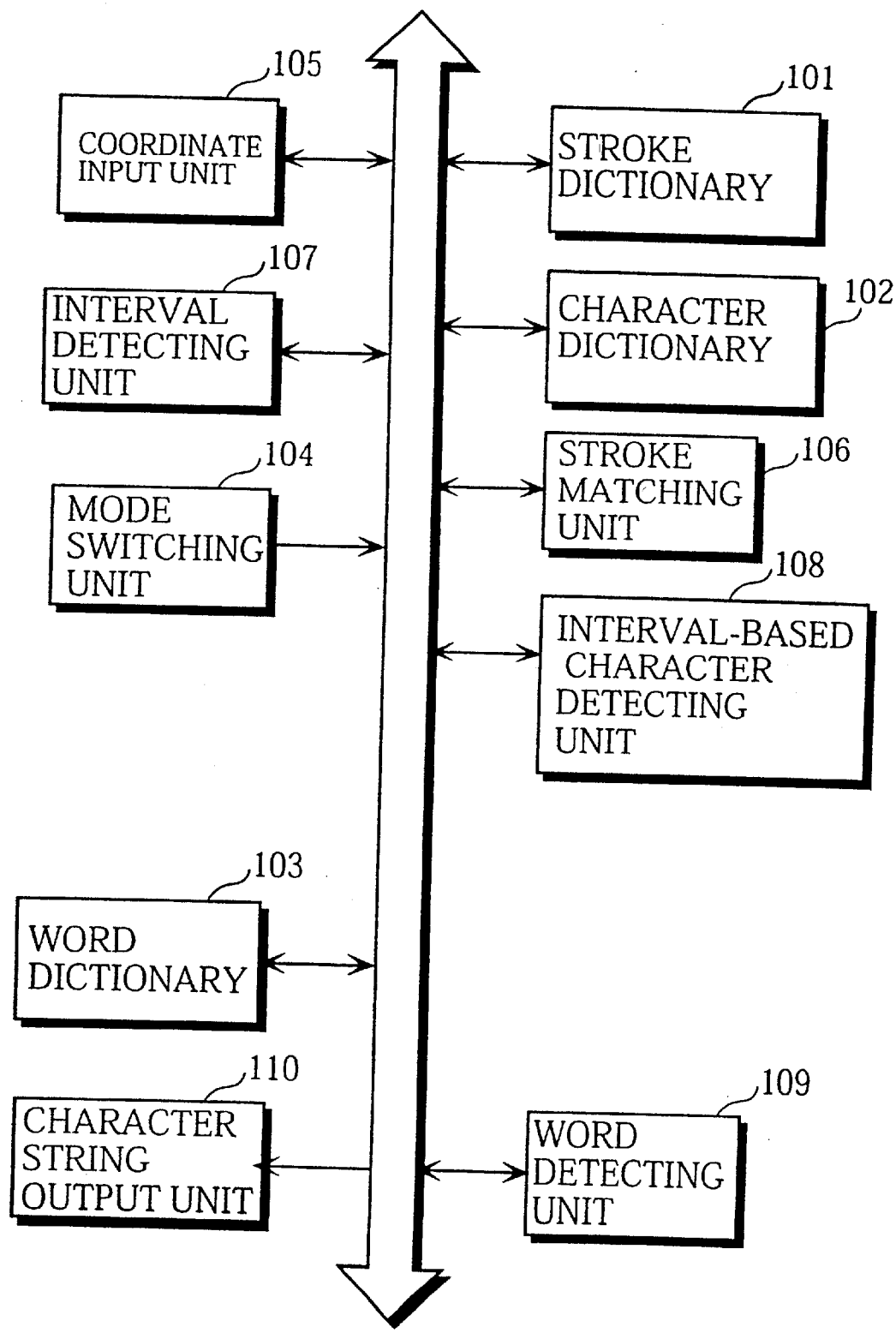
FIG. 1 shows the construction of a character input apparatus in the first embodiment of the present invention.

FIG. 1 shows the construction of a character input apparatus in the first embodiment of the present invention. The character input apparatus is made up of a stroke dictionary 101, a character dictionary 102, a word dictionary 103, a mode switching unit 104, a coordinate input unit 105, a stroke matching unit 106, an interval detecting unit 107, an interval-based character detecting unit 108, a word detecting unit 109, and a character string output unit 110.

Figure 2:
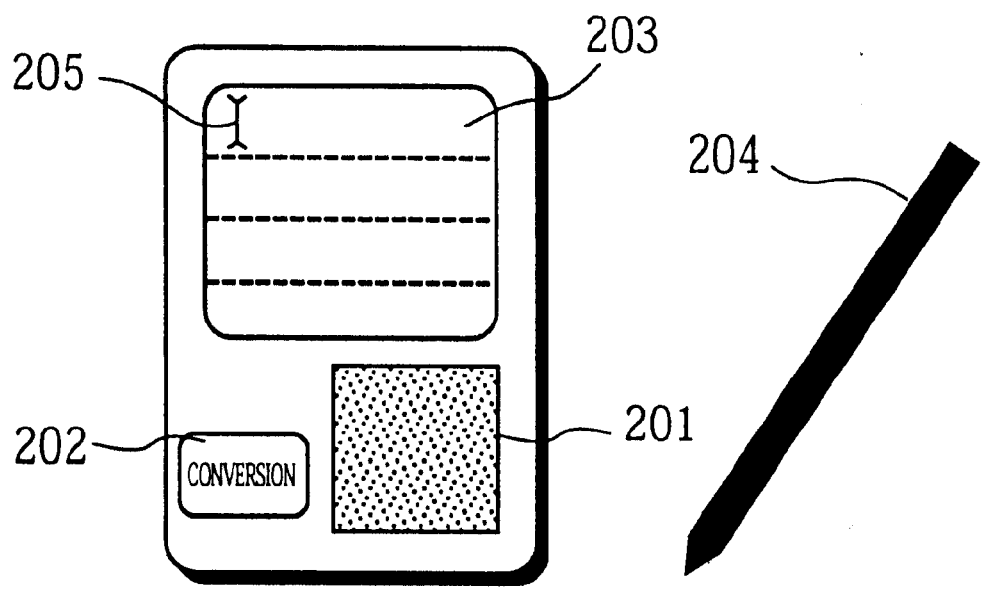
FIG. 2 shows an example front view of the character input apparatus in the above embodiment.

FIG. 2 shows a front view of the character input apparatus. The character input apparatus includes a tablet 201 on which a user handwrites characters, a conversion button 202 that switches the mode of the apparatus to input mode or to learning mode, a display screen 203 that is made up of a display apparatus, such as an LCD panel, for displaying recognized characters and the like, and a stylus 204 with which a user writes characters on the tablet 201. The tablet 201 and the stylus 204 make up the coordinate input unit 105. The conversion button 202 realizes the mode switching unit 104. Character strings outputted by the character string output unit 110 are displayed where a cursor 205 is positioned on the display screen 203.

The stroke dictionary 101 stores stroke information for identifying strokes that constitute characters. A "stroke" here means a single continuous pressing of the tablet 201 with and the direction "d0". The stroke is almost a straight line with no change in direction between the start point and the end point. Therefore, the number of directions 306 is "1". The strokes in FIGS. 6B, 6F, 6H, and 6J also have "1" direction as shown in the number of directions 306.

Figure 6:
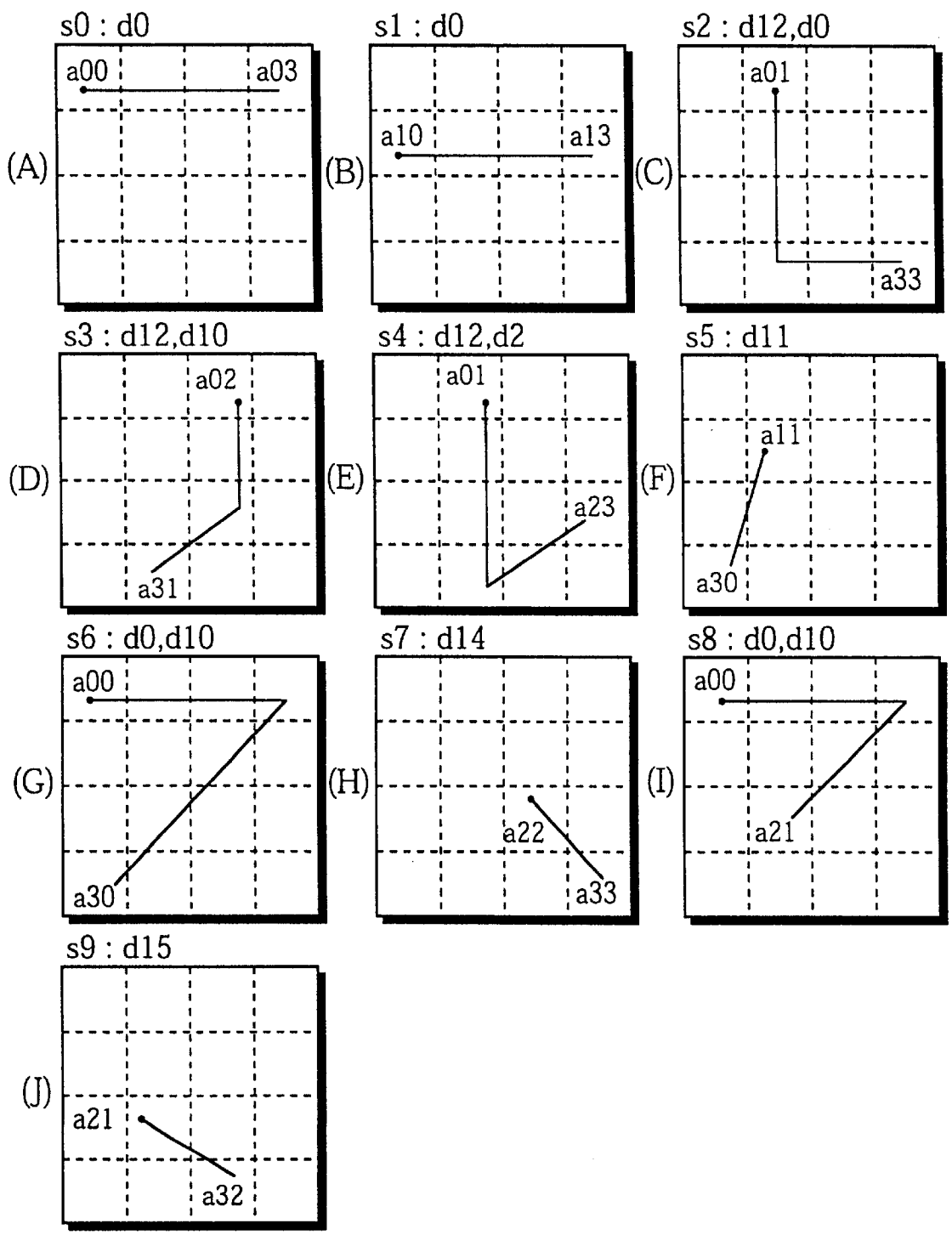
FIGS. 6(A)–(J) show specific examples of strokes in the stroke dictionary in the above embodiment.
Figure 8:
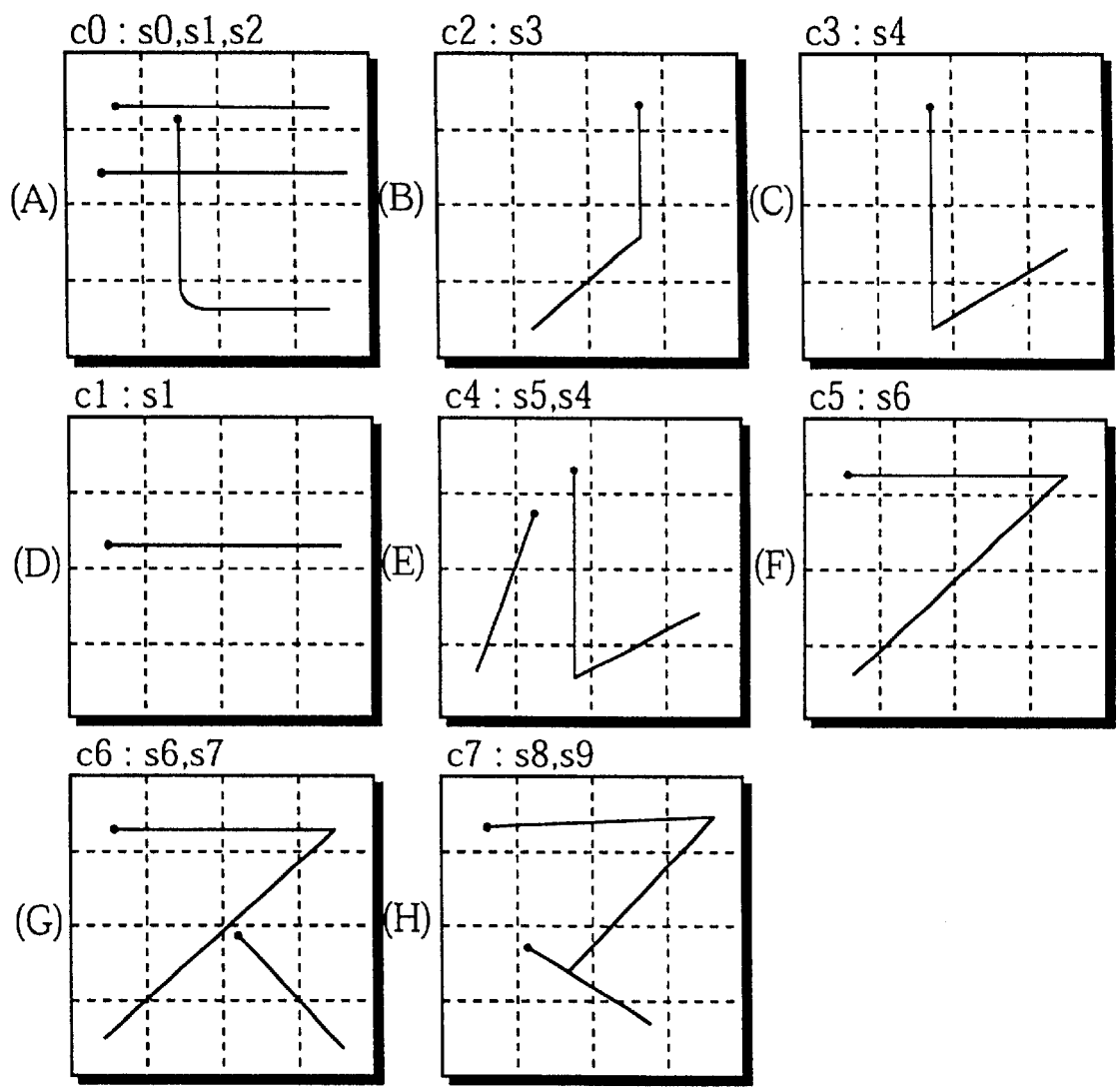
FIGS. 8(A)–(H) show an example of the content of a character dictionary in the above embodiment.

In FIG. 6C, the stroke with the stroke number "s2" is expressed using the start area "a01", the end area "a33", and the direction string "d12, d0". As the direction of the stroke changes almost at a right angle between the start point and the end point, the number of directions 306 is "2". The strokes in FIGS. 6D, 6E, 6G, and 6I also have "2" directions, as shown in the number of directions 306.

As explained above, the stroke dictionary 101 stores stroke information for strokes that constitute characters. The stroke information includes areas on the tablet 201 and directions of the strokes.

The character dictionary 102 stores the order of strokes that constitute each character.

FIG. 7 shows an example of the content of the character dictionary. The character dictionary 102 shows Japanese katakana characters and includes character numbers 702 for identifying characters, characters 703 for showing the corresponding characters, numbers of strokes 704 that constitute characters, and orders of strokes 705. Stroke numbers are used for identifying strokes. Specific examples of the characters numbered with the character numbers "c0" to a stylus when inputting characters.

FIG. 3 shows an example of the content of the stroke dictionary. The stroke dictionary 101 stores stroke information for strokes that constitute Japanese katakana characters and are identified by stroke numbers shown by each stroke number 302. The stroke information includes area information consisting of the start area 303 and the end area 304 that indicate areas where each stroke starts and ends respectively.

Figure 4:
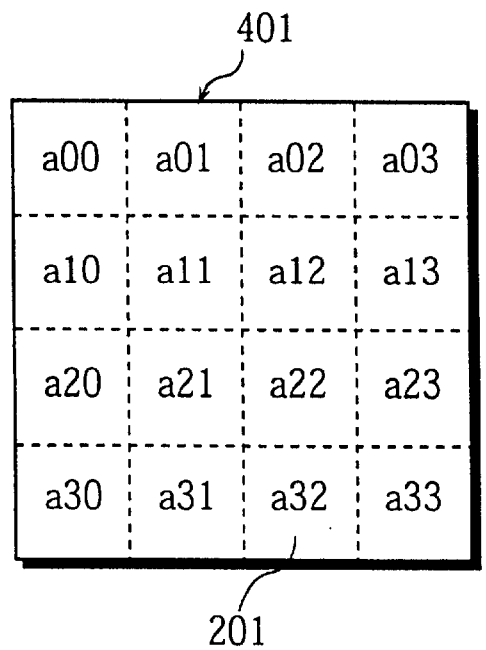
FIG. 4 shows an example of area information in the above embodiment.

FIG. 4 shows area information. The area information 401 is the tablet 201 divided into 4 vertically and horizontally to provide 16 divided areas. These 16 areas are each numbered for identification purposes. The area numbers are used for identifying the start areas and the end areas of strokes.

The stroke information also includes direction information consisting of directions 305 showing the direction from the start point to the end point of a stroke (a number of directions may be given) and the number of directions 306.

Figure 5:
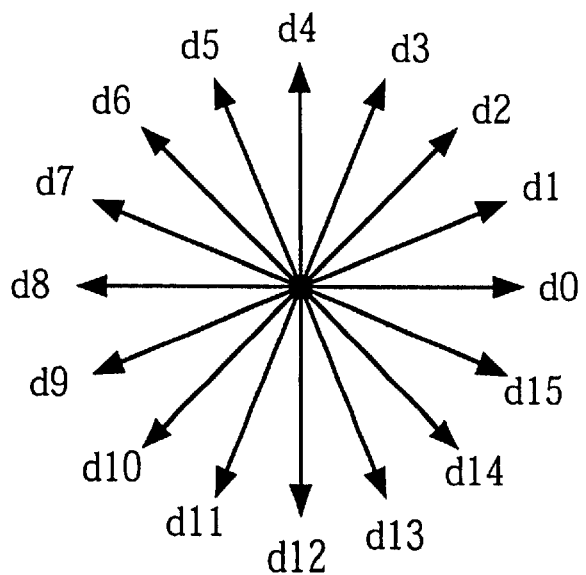
FIG. 5 shows an example of stroke directions in the above embodiment.

FIG. 5 shows 16 quantized directions used for the direction information. The 16 directions are each numbered and are used to express the directions 305. FIGS. 6A through 6J show specific examples of the strokes registered with the stroke numbers s0 to s9 in the stroke dictionary 101. The start points of the strokes are marked with "−" to differentiate them from the end points. In FIG. 6A, the stroke with the stroke number "s0" is expressed using the start area "a00", the end area"a03" , "c7" are shown in FIGS. 8A to 8H.

The characters referred to here include marks such as the long vowel mark "−".

Figures 9, 10:
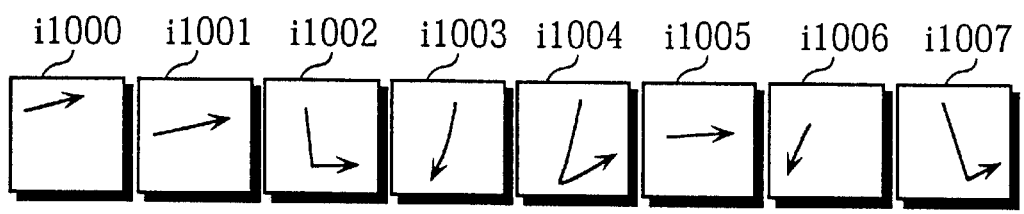
FIG. 9 shows an example of the content of a word dictionary in the above embodiment.
FIG. 10 shows an example of strokes inputted on a coordinate input unit in the above embodiment.

The word dictionary 103 stores the number and the order of characters that constitute each word. FIG. 9 shows an example of the content of the word dictionary. The word dictionary 103 includes word numbers 902 for identifying words, numbers of characters 903 that constitute words, and orders of characters 904.

The mode switching unit 104 switches the mode of the apparatus to input mode or to learning mode when a user presses the conversion button 202.

When a user inputs characters by handwriting on the tablet 201 using a stylus while the apparatus is in input mode, the coordinate input unit 105 notifies the stroke matching unit 106 of coordinates for points on each user stroke of the inputted characters recorded at predetermined intervals as a coordinate string.

The stroke matching unit 106 prestores the area information 401 shown in FIG. 4 and the quantized directions shown in FIG. 5. The area information 401 associates each area with the coordinates that show the boundaries of the area.

When a coordinate string of a user stroke has been received from the coordinate input unit 105, the stroke matching unit 106 finds stroke information for the user stroke. In detail, the stroke matching unit 106 fetches the start area from the coordinate of the start point of the stroke based on the area information 401, the direction numbers from the coordinate string of the stroke using a conventional segment method based on the direction information shown in FIG. 5, and the end area from the coordinate of the end point of the stroke based on the area information 401.

Following this, the stroke matching unit 106 compares the stroke information for a user stroke obtained from the coordinate string received from the coordinate input unit 105 with each set of the stroke information stored in the stroke dictionary 101.

In order to calculate an evaluation value for each set of stroke information in the stroke dictionary 101, (a) a matching evaluation value for area information is determined by calculating the city block distance between pairs of start areas (the start area of a user stroke and the start area of a stroke in the stroke dictionary 101) and between pairs of end areas (the end area of a user stroke and the end area of a stroke in the stroke dictionary 101) and summing the calculation results, and (b) a matching evaluation value for direction information is determined by matching pairs of direction strings using DP (dynamic programming) matching method. The evaluation value for the stroke information is determined by simple sum of the above obtained matching evaluation values for (a) the area and (b) the direction. According to this method, the smaller the evaluation value for the stroke information, the closer the match of the user stroke information with a set of stroke information stored in the dictionary.

The stroke matching unit 106 fetches the stroke numbers of the sets of stroke information in the stroke dictionary 101 that closely match the user stroke and sets the strokes as stroke candidates. The stroke matching unit 106 fetches stroke candidates for each user stroke and notifies the interval-based character detecting unit 108 of the stroke candidates.

For example, when a user handwrites strokes on the tablet 201 using a stylus 204 as shown in FIG. 10, the coordinate input unit 105 notifies the stroke matching unit 106 of each coordinate string of the strokes i1000 to i1007. The stroke matching unit 106 finds stroke information for each of the received strokes. As a result, the stroke information for the strokes i1000 to i1007 handwritten by the user is obtained as shown in FIG. 11. It should be noted that the arrows in FIG. 10 signify the end points of the strokes.

The stroke matching unit 106 then compares the stroke information for each of the strokes i1000 to i1007 with each set of stroke information in the stroke dictionary 101, fetches the closely matching strokes as stroke candidates, and notifies the interval-based character detecting unit 108 of the stroke candidates. These strokes are shown in FIG. 12. In FIG. 12, the five stroke candidates sc0 to sc4 for each of the strokes i1000 to i1007 are respectively expressed using stroke numbers. The numeric value in parenthesis added to each stroke number signifies the evaluation value for each stroke candidate.

For instance, the stroke candidates for the stroke i1000 are shown in order of matching degree as "s0", "s1", "s4", "s2", and "s9". The same is true of the other strokes i1001 to i1007.

The interval detecting unit 107 is equipped with a timer and keeps time when a user starts inputting strokes by handwriting on the coordinate input unit 105. When a stroke is written after an interval of a predetermined time period or longer, the interval detecting unit 107 judges that the stroke is a first stroke of a character and notifies the interval-based character detecting unit 108 of the first stroke.

FIG. 13 shows the time a user started/ended writing the strokes i1000 to i1007 shown in FIG. 10 in seconds. An interval between the stroke i1003 and the stroke i1004 is measured at 0.39 seconds, which is longer than a predetermined time period of, say, 0.3 seconds. The interval detecting unit 107 notifies the interval-based character detecting unit 108 of the stroke i1004 as the first stroke of a character.

The interval-based character detecting unit 108 includes (1) a counter I for indicating one detected stroke at a time when the stroke matching unit 106 searches for character candidates and (2) a counter J for indicating one character in the character dictionary 102 at a time for comparison with the user's writing.

The interval-based character detecting unit 108 first obtains a number of strokes K in a registered character that is currently being compared with the user's handwriting and determines that the current registered character cannot be a character candidate if any of the strokes following the present stroke is indicated by the interval detecting unit 107 as being a first stroke. The interval-based character detecting unit 108 also judges whether stroke numbers of the strokes that compose the character in the character dictionary 102 match the stroke numbers of any combination of the stroke candidates for the I to (I+K−1) th detected strokes. If the judgement is positive, the present character is chosen as a character candidate. After judging whether the present registered character is a character candidate, or finding that the present registered character cannot be a character candidate, the interval-based character detecting unit 108 adds "1" to the counter J. This results in the next registered character being compared with the stroke candidates for the Ith and following strokes. This processing is repeated until the counter J becomes or exceeds the number of characters registered in the character dictionary 102.

When the value of the counter J becomes or exceeds the number of characters registered in the character dictionary 102, the counter J is reset to "0", and "1" is added to the counter I. Detecting character candidates is repeated until the number of the strokes shown by the counter I becomes or exceeds the number of the user strokes indicated by the stroke matching unit 106.

It should be noted that the interval-based character detecting unit 108 is notified of a plurality of stroke candidates for each user stroke by the stroke matching unit 106. Therefore, when stroke candidates for the I to (I+K−1) th strokes are compared with strokes in characters registered in the character dictionary 102, each combination of stroke candidates for the user strokes should be used, which prolongs the comparing process. In order to shorten the comparing process, stroke candidates whose stroke information shows an evaluation value of or beyond a predetermined standard (for example, an evaluation value of "10" or more, which indicates a poor match) among the received stroke candidates for each stroke are excluded from the search target.

When the interval-based character detecting unit 108 has received a stroke string (i.e. a list of consecutive strokes) and stroke candidates for each user stroke in the stroke string as shown in FIG. 12 from the stroke matching unit 106, the interval-based character detecting unit 108 ignores the stroke candidates with an evaluation value of "10" or more.

The interval-based character detecting unit 108 then judges whether the stroke numbers of the stroke candidates for the stroke i1000 match the stroke numbers of strokes in characters in the character dictionary 102 by checking one character at a time starting with the character with the character number "c0".

According to the character dictionary 102, the character "モ" with the character number "c0" has "3" strokes (i.e. K=3) Therefore, the interval-based character detecting unit 108 judges whether the stroke numbers of any combination of the stroke candidates for the stroke string i1000 to i1002 match the stroke numbers shown in the order of strokes 705 in Fig. 7. The stroke numbers "s0", "s1", and "s2" of the best stroke candidates "sc0" for these three user strokes match the stroke numbers shown in the order of strokes 705, so this character "c0 (モ)" is chosen as a character candidate.

While the character candidate "c0 (モ)" is chosen for the user strokes i1000 to i1002, the stroke number "s1" of the stroke candidate "sc1" for the stroke i1000 matches the stroke number of a long vowel mark "(—)" stored in the character dictionary 102 with the character number "c1", therefore the character candidate "c1 (—)" is also chosen for the stroke i1000. In the same way, the character candidate "c1 (—)" is chosen for the stroke i1001, and "c3 (レ)" is chosen for the stroke i1002.

The stroke numbers of the character "ル" with the character number "c4" in the character dictionary 102 match the stroke numbers of the stroke candidates for the user strokes i1003 and i1004. However, the character candidate "ル" is not detected as the interval detecting unit 107 has notified the interval-based character detecting unit 108 that the stroke i1004 is a first stroke of a character.

The character candidate "c2 ( ノ )" is chosen for the stroke i1003 and "C3 (レ)" is chosen for the stroke i1004.

In the above described way, the interval-based character detecting unit 108 detects character candidates for each stroke and combination of strokes as shown in FIG. 14. When the detecting is complete, the interval-based character detecting unit 108 informs the word detecting unit 109 of these character candidates.

When the character candidates have been received from the interval-based character detecting unit 108, the word detecting unit 109 detects words by referring to the word dictionary 103.

When the character candidates shown in FIG. 14 have been received, the word detecting unit 109 tries to find a word that has the character candidate "モ" for the stroke string i1000 to i1002 as a first character by browsing the word dictionary 103. The word dictionary 103 includes a word w4 which has the character candidate "モ" as a first character. If a character string for the word w4 matches a string composed of character candidates for the user strokes i1000 to i1007, the word w4 is detected. The word w4 is composed of five characters, with the remaining characters being compared one at a time with a string of character candidates starting from the character candidates for the stroke i1003.

The character candidates " ノ " for the stroke i1003, "レ" for the stroke i1004, "—" for the stroke i1005, and "ル" for the strokes i1006 and i1007 match the word w4, therefore, the word w4 "モノレール (monorail)" is detected. As the word dictionary 103 does not include any other words that have the character "モ" as a first character, the processing moves to the searching words with the character candidate "—" for the stroke i1000 as a first character. As no such word is found, the searching ends. When the word dictionary 103 includes other words that have the character "モ" as a first character, combinations of the character candidates for the stroke i1003 and the following strokes are examined.

The word detecting unit 109 notifies the character string output unit 110 of the detected word. The character string output unit 110 displays the word on the display screen 203 and at the same time stores the word onto a storage medium (not illustrated).

Figure 15:
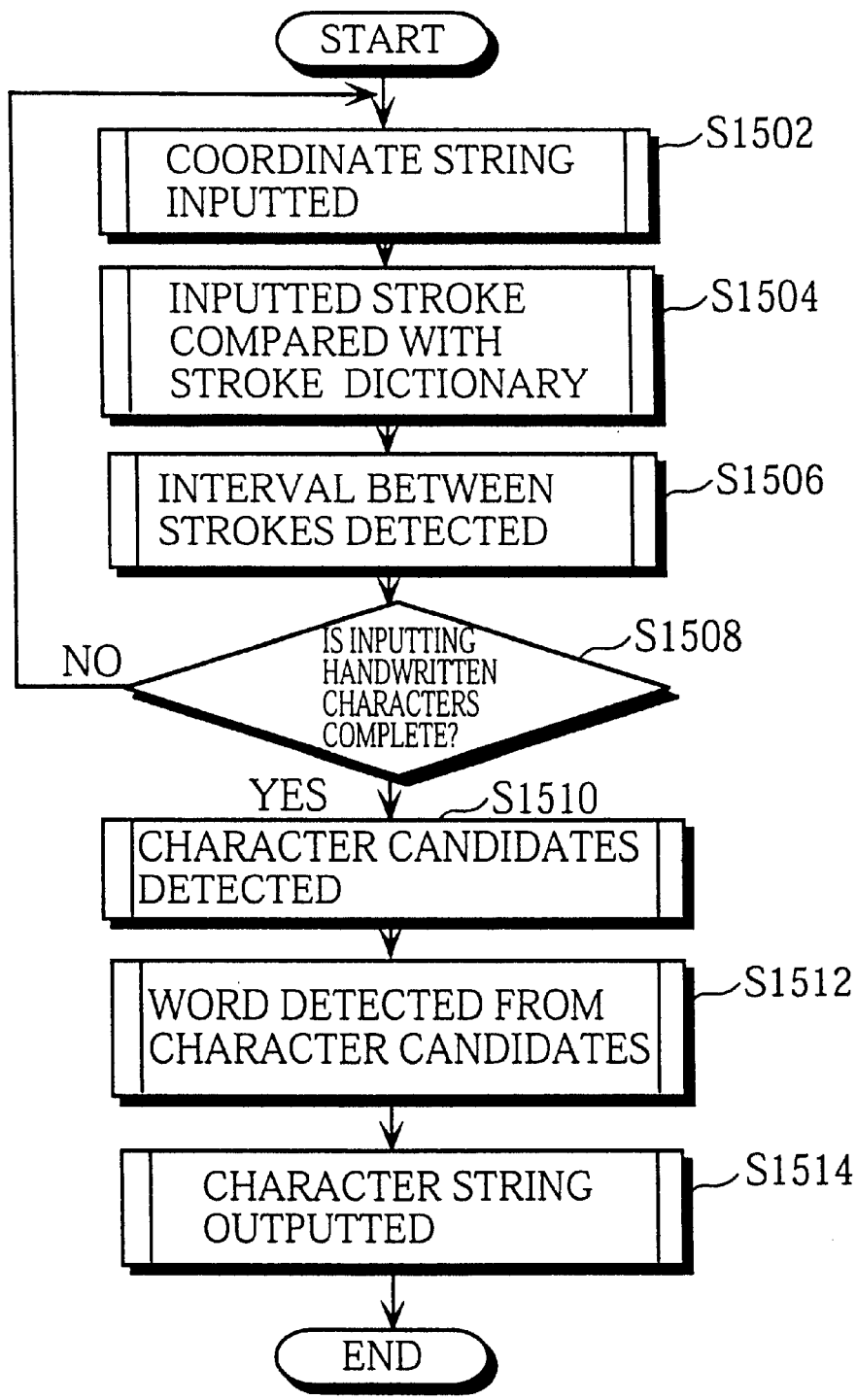
FIG. 15 is a flowchart explaining the operation of the above embodiment.
Figure 16:
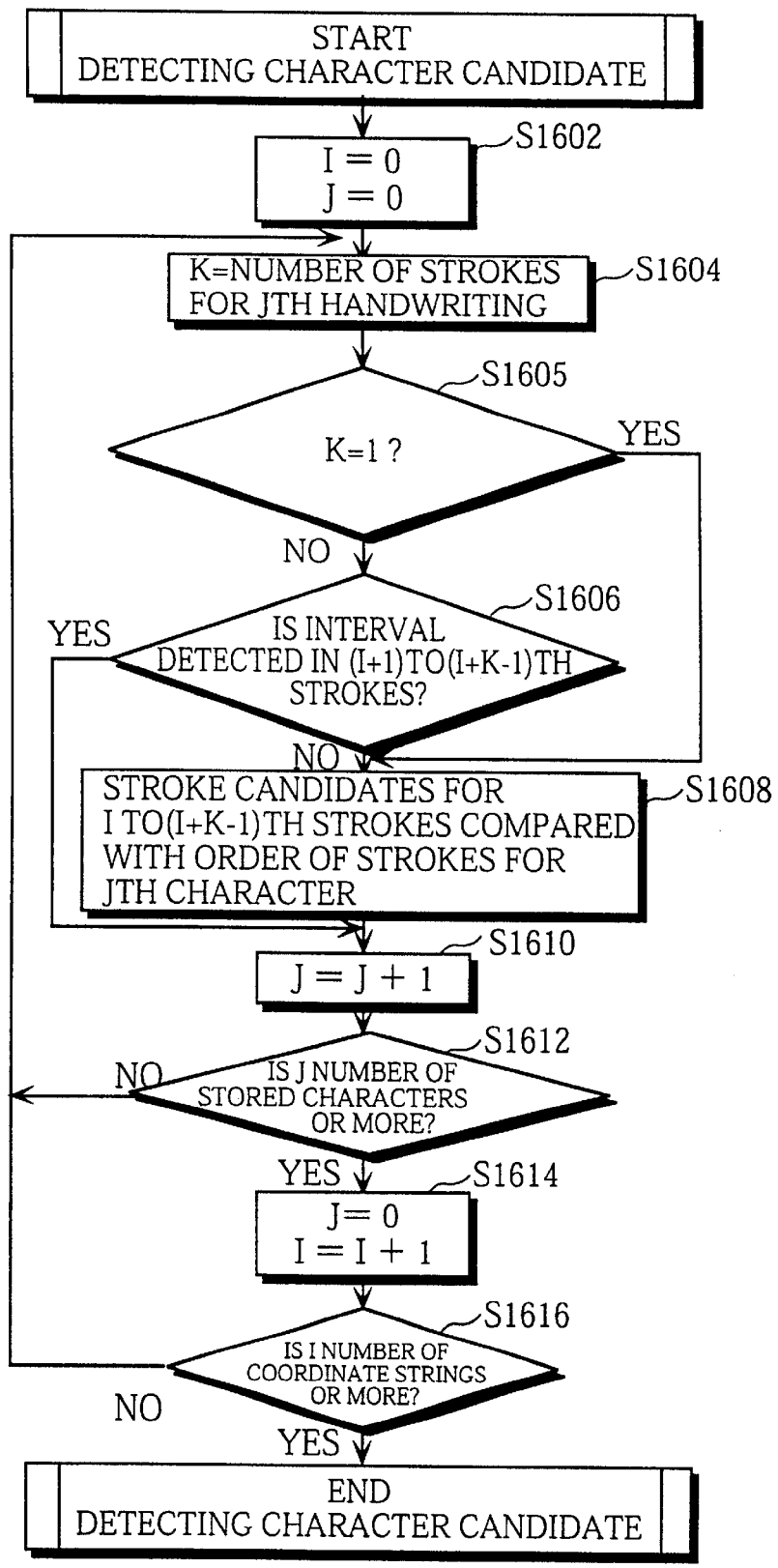
FIG. 16 is a flowchart explaining step S1510 in FIG. 15 in detail in the above embodiment.

The following is an explanation of the operation of the present embodiment with reference to the flowcharts shown in FIGS. 15 and 16.

When a user handwrites characters on the tablet 201 using the stylus 204, the coordinate input unit 105 notifies the stroke matching unit 106 of a coordinate string for each inputted stroke (S1502).

The stroke matching unit 106 finds stroke information for the received coordinate string, calculates evaluation values by comparing the obtained stroke information and sets of stroke information stored in the stroke dictionary 101, selects stroke candidates for the stroke, and notifies the interval-based character detecting unit 108 of the stroke candidates (S1504).

The interval detecting unit 107 keeps time when a user starts/ends inputting characters by handwriting, detects a stroke that is written after an interval that is at least as long as the predetermined time period, and gives the interval-based character detecting unit 108 a message stating that the stroke is a first stroke of a character (S1506).

The above processing is repeated until a user stops inputting handwritten characters (S1508).

The interval-based character detecting unit 108 detects character candidates, and notifies the word detecting unit 109 of the detected character candidates (S1510). This step will be explained in detail later with reference to the flowchart in FIG. 16.

The character detecting unit 109 detects a word from the detected character candidate string by browsing the word dictionary 103 (S1512).

The character string output unit 110 displays the word detected by the word detecting unit 109 on the display screen 203 and the processing ends (S1514).

The following is a detailed explanation of the character candidate detecting process (S1510) with reference to the flowchart in FIG. 16.

The interval-based character detecting unit 108 sets the initial value of the counter I and the counter J to "0" (S1602). Following this, the number of strokes K in the character with the character number cJ registered in the character dictionary 102 is fetched (S1604). The interval-based character detecting unit 108 then judges whether the number of strokes K is "1" (S1605), and if not, the interval-based character detecting unit 108 judges whether any user stroke that has been detected by the interval detecting unit 107 as being a first stroke is included in the (I+1) to (I+K−1) th user strokes (S1606). If the judgement is positive, the interval-based character detecting unit 108 adds "1" to the counter J (S1610)

On judging that none of these user strokes is a first stroke, or if the number of strokes K is judged to be "1" in step S1605, the interval-based character detecting unit 108 compares the combinations of stroke candidates for the I to (I+K−1) th user strokes with the order of strokes in the present registered character cJ in the character dictionary 102. If a combination of stroke candidates matches, the registered character cJ is chosen as a character candidate (S1608). This completes the judgement for the present registered character cJ, so the interval-based character detecting unit 108 adds "1" to the counter J (S1610).

The interval-based character detecting unit 108 judges whether the value of the counter J is or exceeds the number of characters stored in the character dictionary 102 (S1612). If not, the processing returns to step S1604, or if so, the counter J is reset to "0" and "1" is added to the counter I (S1614)

Following this, the interval-based character detecting unit 108 judges whether a value of the counter I is or exceeds the number of the strokes indicated by the stroke matching unit 106. If not, the processing returns to step S1604, or if so, the detecting of character candidates ends.

Second Embodiment

Figure 17:
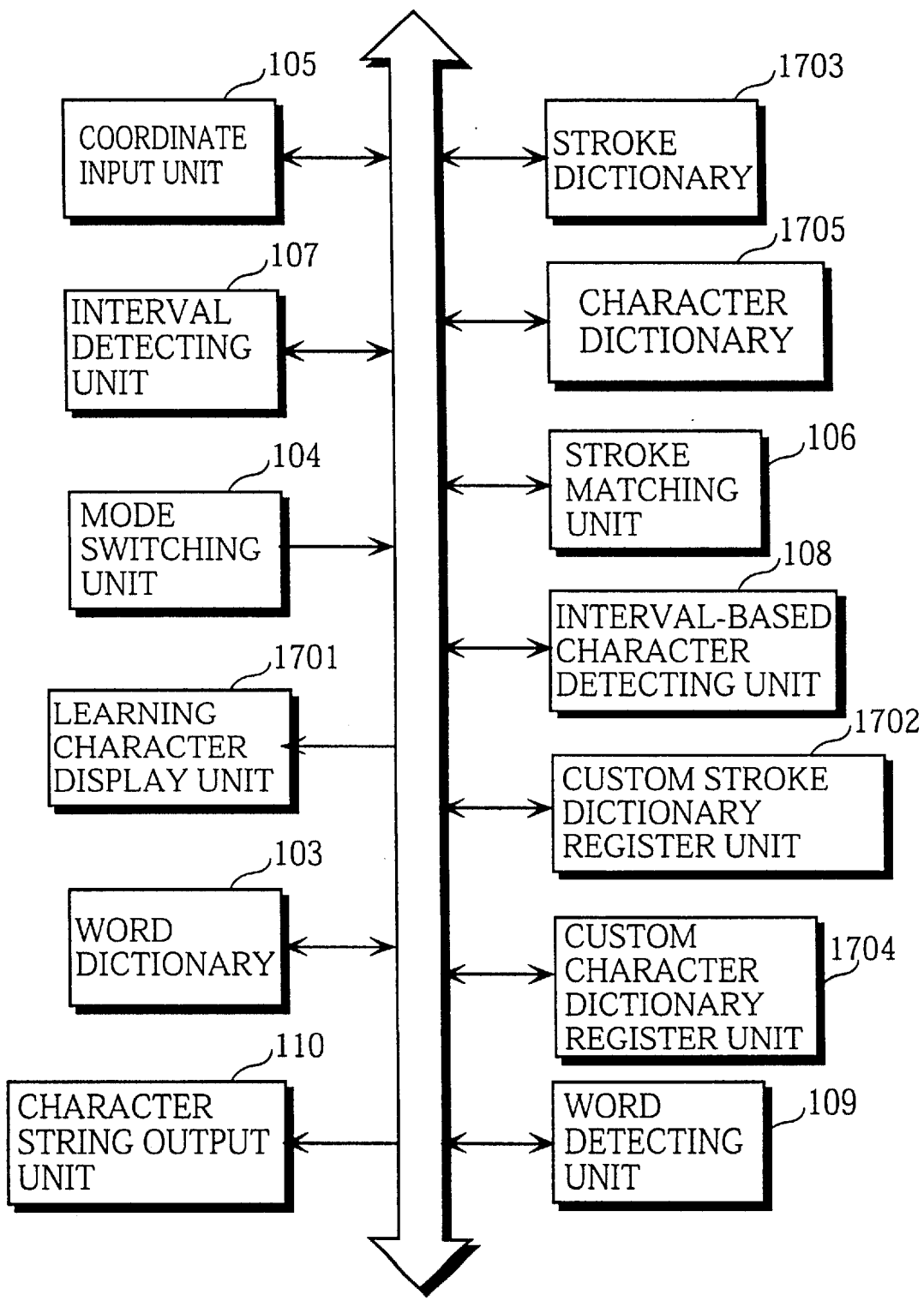
FIG. 17 shows the construction of a character input apparatus in the second embodiment of the present invention.

FIG. 17 shows the construction of a character input apparatus in the second embodiment of the present invention. The character input apparatus is made up of a word dictionary 103, a mode switching unit 104, a coordinate input unit 105, a stroke matching unit 106, an interval detecting unit 107, an interval-based character detecting unit 108, a word detecting unit 109, a character string output unit 110, a learning character display unit 1701, a custom stroke dictionary register unit 1702, a stroke dictionary 1703, a custom character dictionary register unit 1704, and a character dictionary 1705. It should be noted that the elements that are the same as those of the character input apparatus in the first embodiment are indicated by the same numbers and are not explained in the present embodiment. The following is an explanation of the elements unique to the present embodiment.

The stroke dictionary 101 and the character dictionary 102 in the first embodiment respectively store the standard stroke information that can be obtained from normal handwritten strokes and the standard order of strokes for each character. The character input apparatus in the present embodiment is capable of recognizing a user's handwritten characters by learning the user's handwriting patterns and registering the patterns in the stroke dictionary 1703 and the character dictionary 1705.

A user presses the mode switching unit 104 to switch the mode of the apparatus to learning mode. When the user indicates a character to be learned using operation keys and the like (not illustrated), the mode switching unit 104 notifies the learning character display unit 1701 and the custom character dictionary register unit 1704 of the inputted character.

The learning character display unit 1701 displays the character on the display screen 203. The user then handwrites the character to be learned on the tablet 201 using the stylus 204. The coordinate input unit 105 notifies the stroke matching unit 106 of a coordinate string of each stroke in the handwritten character. The stroke matching unit 106 finds stroke information for each stroke from the coordinate string of the stroke, compares the stroke information with each set of stroke information in the stroke dictionary 1703 to detect stroke candidates, and notifies the custom stroke dictionary register unit 1702 of the detected stroke candidates and the evaluation values for the stroke candidates.

When an evaluation value for any of the stroke candidates received from the stroke matching unit 106 is a value showing a degree of matching between the user stroke and the stroke in the stroke dictionary 1703 that is below a predetermined level, the custom stroke dictionary register unit 1702 registers the stroke information for the stroke in the stroke dictionary 1703 with a stroke number. After this, the custom stroke dictionary register unit 1702 notifies the custom character dictionary register unit 1704 of the stroke number. Here, if all evaluation values for the stroke candidates received from the stroke matching unit 106 are values showing a degree of matching between the user stroke and the strokes in the stroke dictionary 1703 that is at least a predetermined level, the custom stroke dictionary register unit 1702 informs the custom character dictionary register unit 1704 of the strokes in received order.

Figure 18:
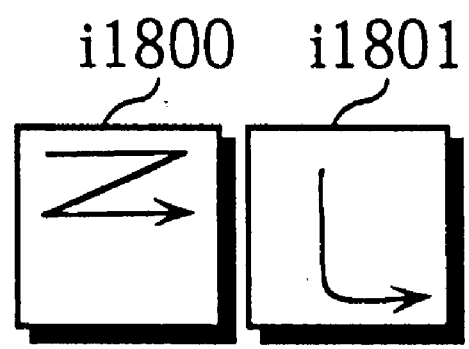
FIG. 18 shows strokes of handwritten characters inputted in learning mode in the above embodiment.

Suppose the apparatus is learning a character "モ" in learning mode. A user inputs the character "モ" by handwriting on the coordinate input unit 105. The coordinate input unit 105 notifies the stroke matching unit 106 of the coordinate strings of the strokes i1800 and i1801 shown in FIG. 18.

The stroke matching unit 106 finds stroke information for each of the strokes i1800 and i1801 from the coordinate strings of the strokes. FIG. 19 shows the stroke information 1901.

The stroke matching unit 106 compares the sets of stroke information for the strokes i1800 and i1801 with each set of stroke information originally registered in the stroke dictionary 1703 (as in the stroke dictionary 101 in FIG. 3), detects stroke candidates, calculates evaluation values for the stroke candidates as shown in FIG. 20, and notifies the custom stroke dictionary register unit 1702 of the stroke candidates and the evaluation values.

When the smallest evaluation value among the evaluation values for the sets of stroke information for the stroke candidates received from the stroke matching unit 106 exceeds a predetermined threshold (for example, "2"), the custom stroke dictionary register unit 1702 judges that the stroke information for the user stroke inputted on the coordinate input unit 105 is not in the stroke dictionary 1703, and registers the stroke information in the stroke dictionary 1703.

Regarding the stroke i1800, the evaluation value for the stroke information for the stroke candidate s4 that shows the closest match in the stroke candidates is "16", so the stroke information for the stroke i1800 is not stored in the stroke dictionary 1703. The custom stroke dictionary register unit 1702 registers the stroke information for the stroke i1800 in the stroke dictionary 1703 with the stroke number s10.

Regarding the stroke i1801, the evaluation value for the stroke information for the stroke candidate s2 that shows the closest match in the stroke candidates is "0", which means that the stroke information for the stroke i1801 is already stored in the stroke dictionary 1703.

The custom stroke dictionary register unit 1702 notifies the custom character dictionary register unit 1704 of the stroke numbers "s10" and "s2" as the order of strokes that constitute the character.

The stroke dictionary 1703 includes a RAM and the like and stores stroke numbers and stroke information as shown in FIG. 21. The stroke numbers "s0" to "s9" are originally stored in the stroke dictionary 1703 as in the stroke dictionary 101. The stroke information for the stroke with the stroke number "s10" has been additionally registered in the stroke dictionary 1703 in learning mode.

When the character has been received from the mode switching unit 104 and the order of the strokes has been received from the custom stroke dictionary register unit 1702, the custom character dictionary register unit 1704 registers the character, the number of strokes in the received order of the strokes, and the order of the strokes in the character dictionary 1705.

As the character "モ" and the stroke numbers "s10" and "s2" have been received, the custom character dictionary register unit 1704 registers the number of strokes "2" and the order of the strokes as the character "モ" with the character number "c8" in the dictionary 1705 as shown in FIG. 22.

The character dictionary 1705 includes a RAM and the like. The character numbers "c0" to "c7" are originally stored in the character dictionary 1705 as in the character dictionary 102. The character "モ" with the character number "c8" has been additionally registered in the character dictionary 1705 in learning mode.

Next, a user presses the conversion button 202 to switch the mode to input mode, and inputs characters by handwriting on the coordinate input unit 105. The inputted handwritten characters are recognized in the same way as in the first embodiment.

Figure 23:
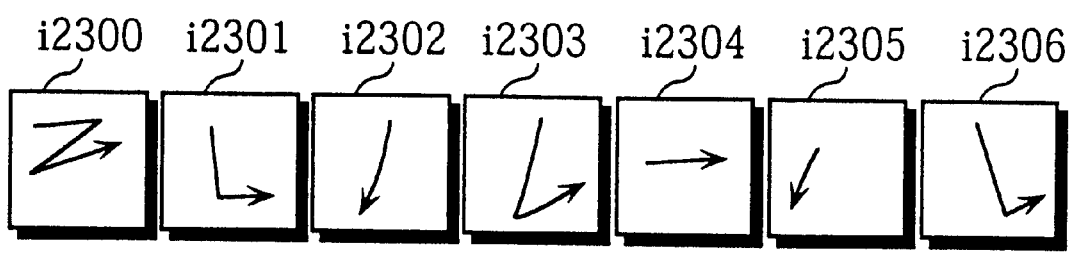
FIG. 23 shows specific examples of strokes inputted on a coordinate input unit in the above embodiment.

For instance, the coordinate input unit 105 notifies the stroke matching unit 106 of a coordinate string for each of the strokes i2300 to i2306 shown in FIG. 23.

The stroke matching unit 106 finds stroke information for each stroke from the coordinate strings, compares the stroke information with each set of stroke information in the stroke dictionary 1705 to detect stroke candidates, and calculates evaluation values for the stroke candidates as shown in FIG. 25. The stroke matching unit 106 notifies the interval-based character detecting unit 108 of the stroke candidates and the evaluation values.

The interval detecting unit 107 keeps time when a user starts/ends inputting each stroke as shown in FIG. 26, and notifies the interval-based character detecting unit 108 of a stroke i2303, which has been inputted after an interval that is at least as long as a predetermined time, as being a first stroke of a character.

The interval-based character detecting unit 108 compares combinations of stroke candidates that have an evaluation value below a predetermined value with characters in the character dictionary 1705, detects the character candidates shown in FIG. 27, and notifies the word detecting unit 109 of the character candidates. In this process, the character "モ" with the character number "c8" is chosen for the strokes i2300 and i2301 as a character candidate.

The word detecting unit 109 searches the word dictionary 103 and detects a character string "モノレール (monorail)" as he inputted handwritten characters.

Figure 28:
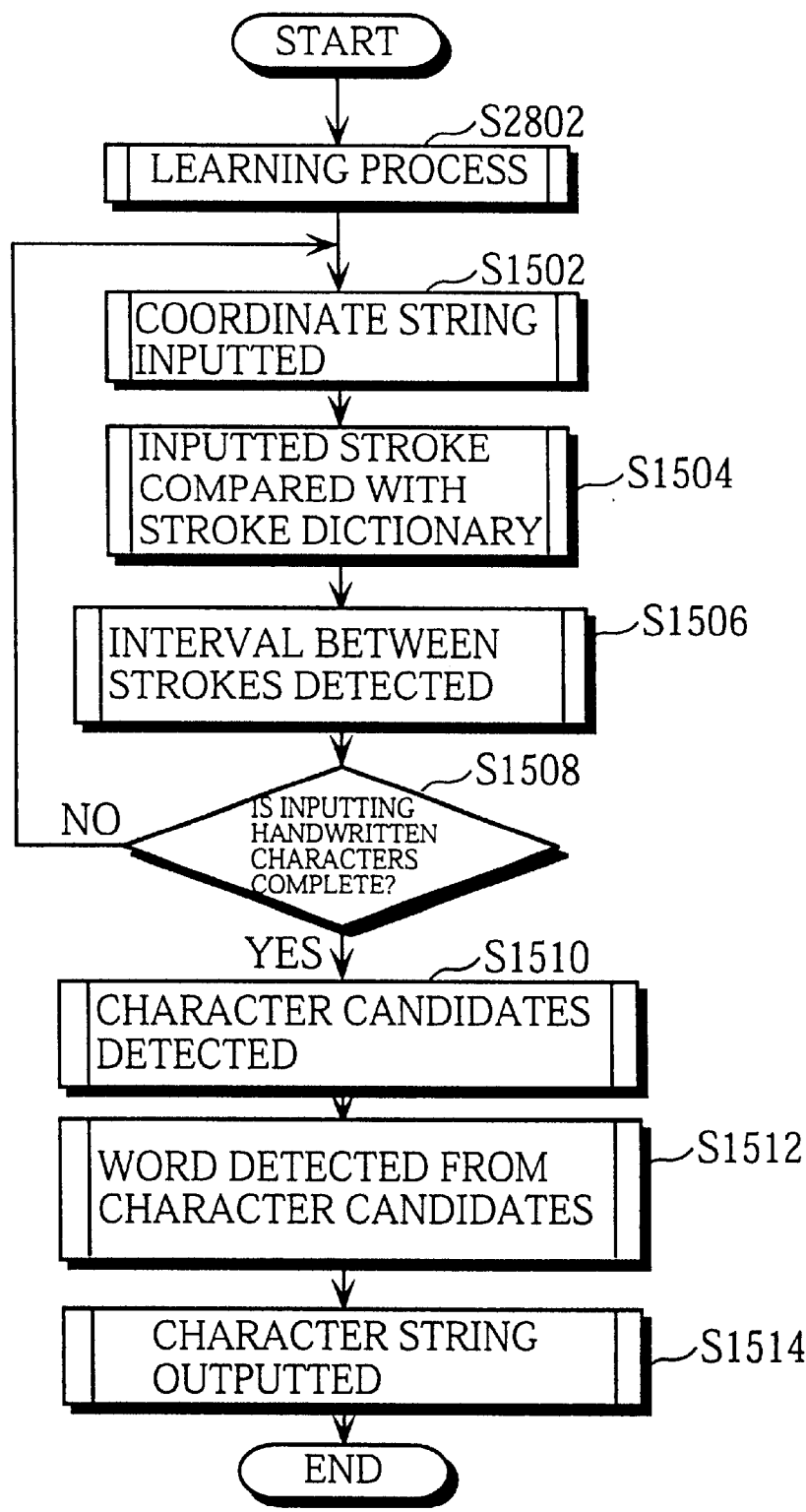
FIG. 28 is a flowchart explaining the operation of the above embodiment.
Figure 29:
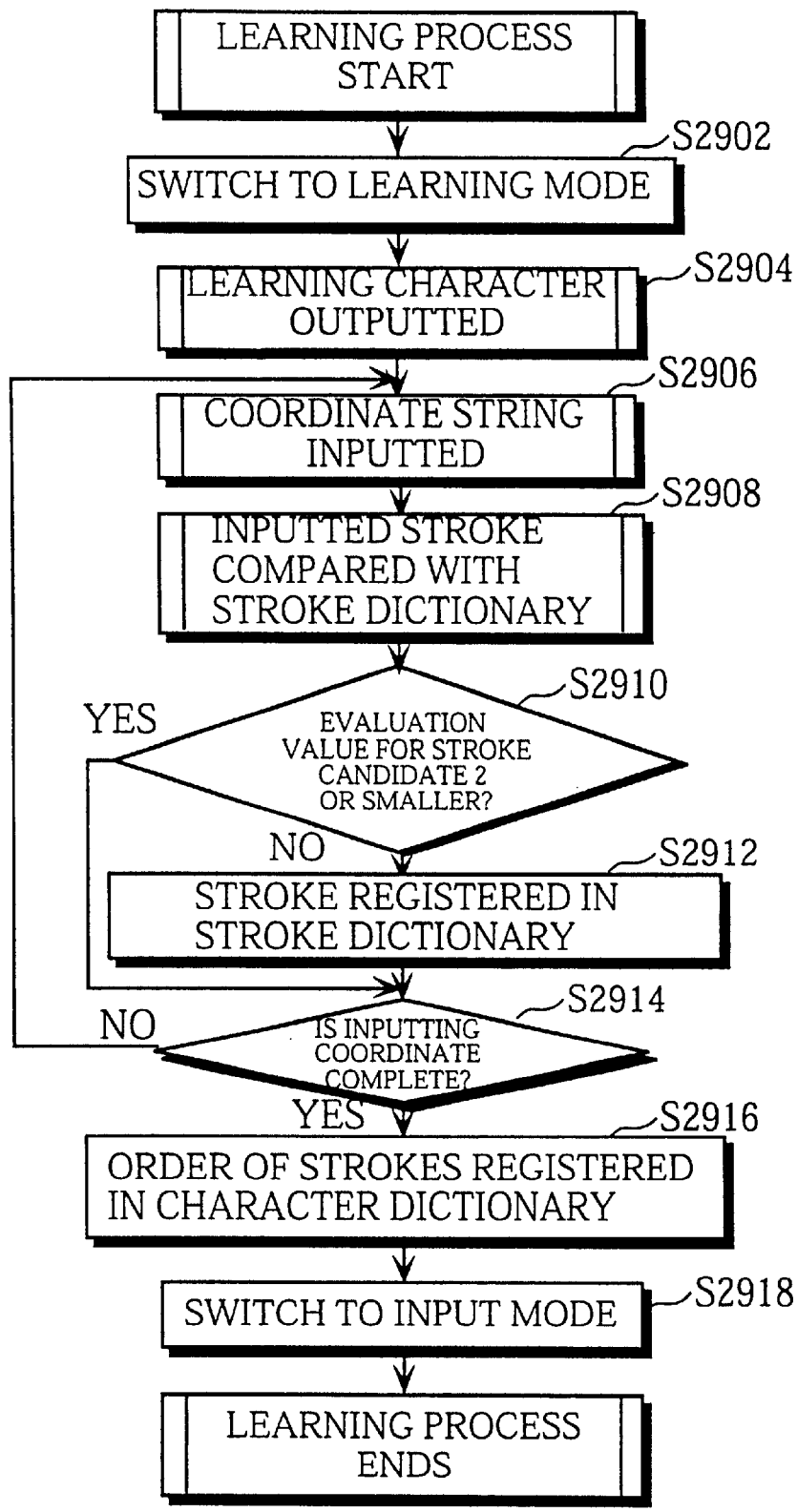
FIG. 29 is a flowchart explaining step S2802 in FIG. 28 in detail in the above embodiment.

The following is an explanation of the operation of the present embodiment with reference to the flowcharts shown in FIGS. 28 and 29. In FIG. 28, only step S2802 is unique to the present embodiment and other steps are the same as in the first embodiment.

A user presses the conversion button 202 to switch the mode of the apparatus to learning mode so that the learning of inputted handwritten characters is performed (S2802).

The steps following step S2802 are the same as steps S1502 to S1514 in the first embodiment, and are not explained here.

The following is a detailed explanation of step S2802 with reference to the flowchart in FIG. 29.

The mode of the apparatus is switched to learning mode when a user presses the conversion button 202 (S2902). The user indicates a character to be learned with operation keys (not illustrated) so that the learning character display unit 1701 displays the character (S2904). The user then handwrites a character to be learned. The coordinate input unit 105 receives the handwritten character and notifies the stroke matching unit 106 of a coordinate string of each stroke in the handwritten character (S2906).

The stroke matching unit 106 finds stroke information for each inputted stroke from the coordinate string of the stroke, compares the stroke information with each set of stroke information in the stroke dictionary 1703, detects stroke candidates, calculates evaluation values for the stroke candidates, and notifies the custom stroke dictionary register unit 1702 of the stroke candidates and the evaluation values (S2908).

The custom stroke dictionary register unit 1702 judges whether the evaluation value showing the closest match among the evaluation values for the stroke candidates received from the stroke matching unit 106 is "2" or smaller (S2910). If the judgement is positive, the processing advances to step S2914, or if not, the stroke information is additionally registered in the stroke dictionary 1703 with a stroke number (S2912) The process from step S2906 through S2912 is repeated until coordinate strings have been inputted for all strokes on the coordinate input unit 105 (S2914).

When stroke information is additionally registered in the stroke dictionary 1703, the custom character dictionary register unit 1704 registers the character to be learned and the number and the order of the strokes in the character dictionary 1705 (S2916).

The mode of the apparatus is switched to input mode when the user presses the conversion button (S2918), and the learning process ends.

In the present embodiment, new stroke information and the order of strokes are additionally registered in the stroke dictionary 1703 and the character dictionary 1705 while the apparatus is in learning mode. However, a user dictionary may be provided for registering new stroke information and the order of strokes, and the content of the user dictionary may be compared with user handwriting when the apparatus is in input mode.

Third Embodiment

Figure 30:
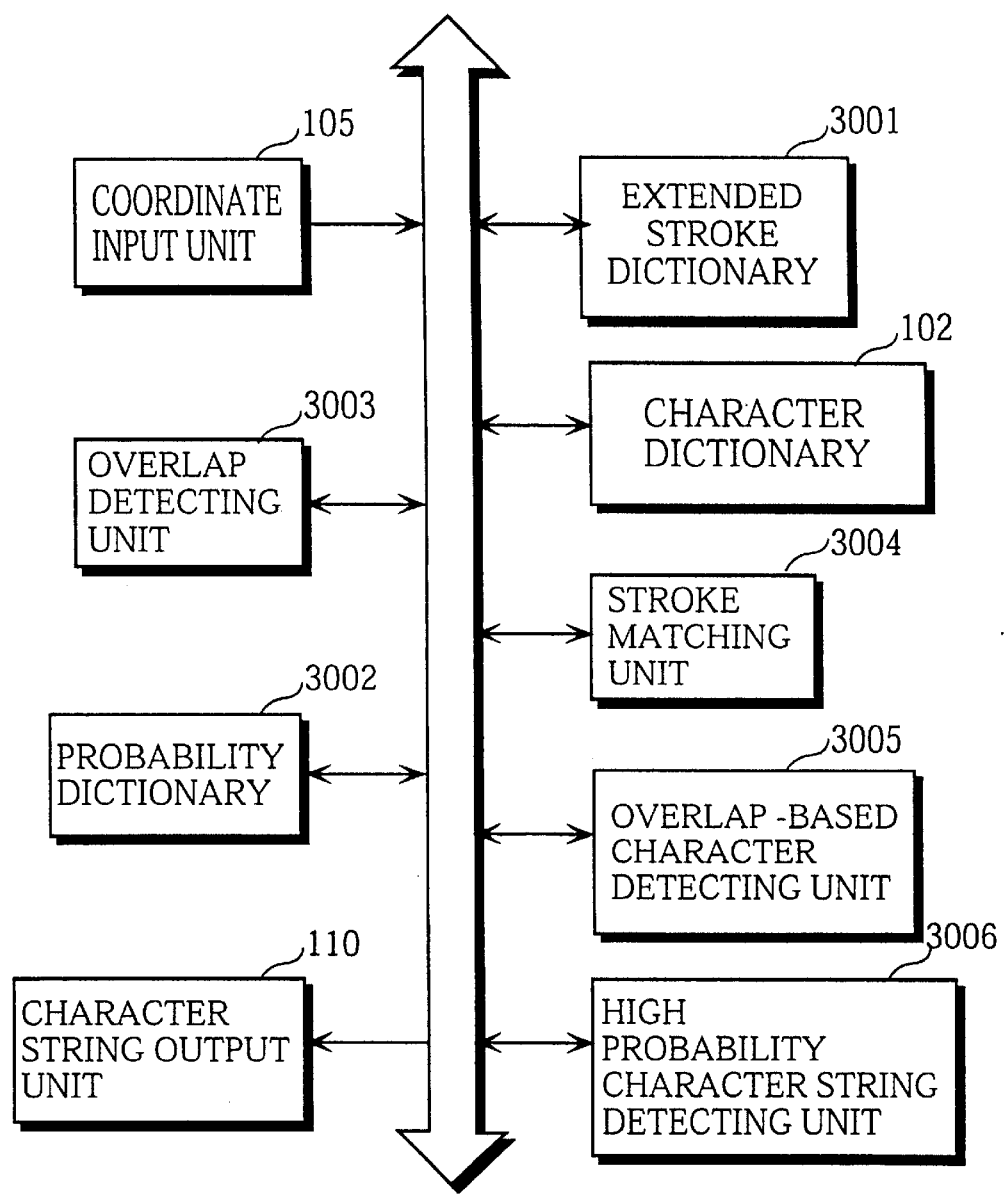
FIG. 30 shows the construction of a character input apparatus in the third embodiment of the present invention.

FIG. 30 shows the construction of a character input apparatus in the third embodiment of the present invention. The character input apparatus is made up of an extended stroke dictionary 3001, a character dictionary 102, a probability dictionary 3002, a coordinate input unit 105, an overlap detecting unit 3003, a stroke matching unit 3004, an overlap-based character detecting unit 3005, a high probability character string detecting unit 306, and a character string output unit 110. It should be noted that the elements that are the same as those of the character input apparatus in the first embodiment are indicated by the same numbers and are not explained in the present embodiment. The following is an explanation of the elements unique to the present embodiment.

Figure 31:
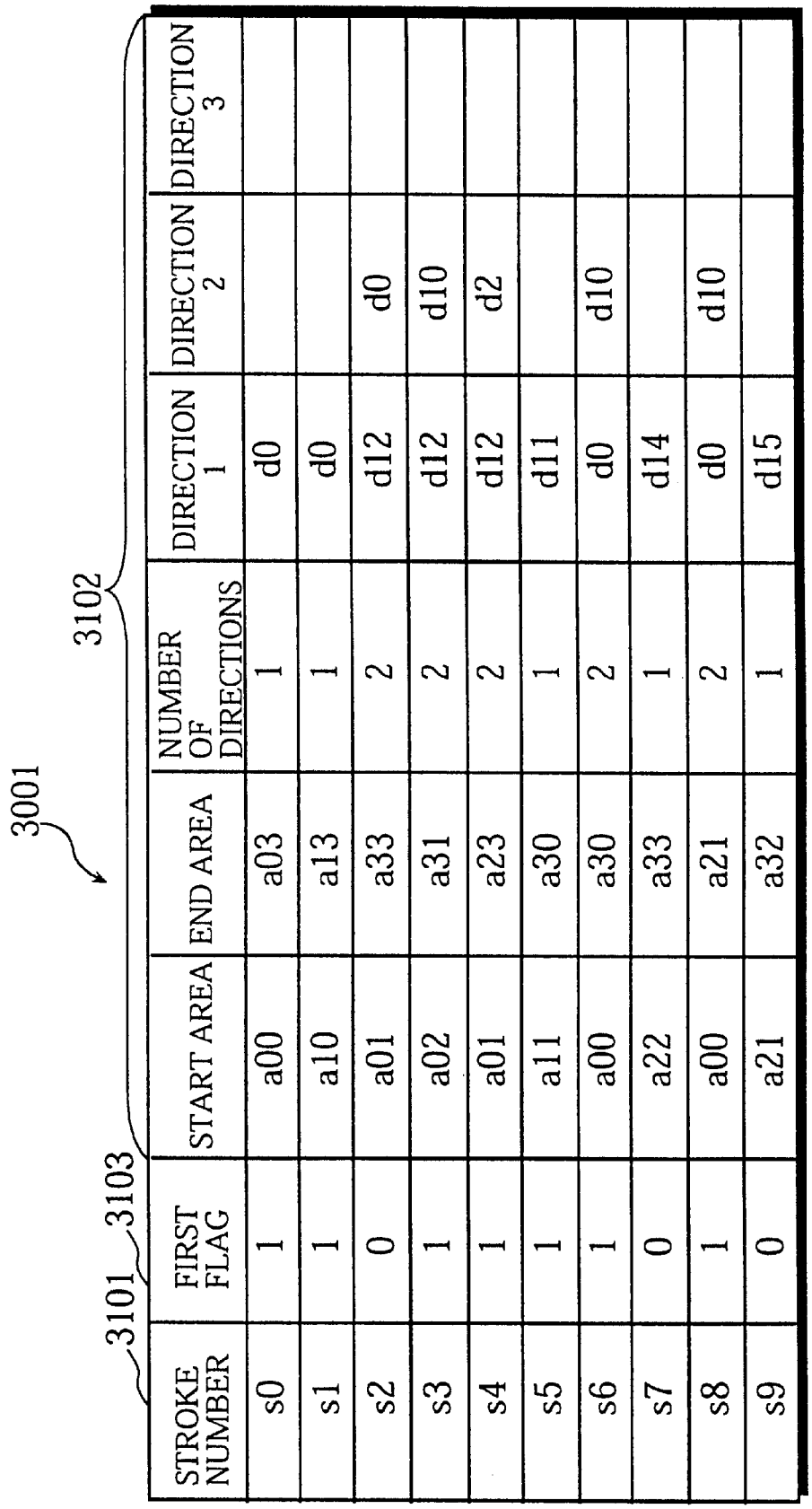
FIG. 31 shows an example of the content of a stroke dictionary with flag in the above embodiment.

As shown in FIG. 31, the extended stroke dictionary 3001 stores stroke numbers 3101 and stroke information 3102 as the stroke dictionary 101, but also includes the first flag 3103 for showing whether each stroke has the possibility of being a first stroke of characters. The first flag 3103 is set at "1" for strokes that have the possibility of being a first stroke of characters and at "0" for strokes that have no such possibility.

The probability dictionary 3002 stores the probability of each character appearing before/after another character in a character string. The probability is expressed using a predetermined numeric value. FIG. 32 shows an example of the content of the probability dictionary 3002. This shows a numeric value of the probability for each of the characters 3201 appearing after each of the characters 3202. For example, the probability that a character "モ" in the characters 3202 appears before the character "モ" in the characters 3201 is "4", and the probability that "nothing" comes before said character, that is, the character "モ" is a first character is "8". The probability that a character "モ" in the characters 3202 appears before the long vowel mark "ー" in the characters 3201 is "8", and the probability that "nothing" comes before the long vowel mark, that is, the mark is a first character is "0".

The overlap detecting unit 3003 detects overlaps in the coordinates of a plurality of strokes inputted on the coordinate input unit 105. In the present embodiment, the judgement as to whether coordinates of two sequential strokes are on the same line segment is performed using Hough transform method. When the overlap detecting unit 3003 detects two sequential strokes that overlap, it notifies the overlap-based character detecting unit 3005 of the latter stroke of the strokes that overlap.

The overlap detecting unit 3003 checks whether strokes in the same character are not overlapped (while strokes may cross, they cannot have coincident line segments). In the present example, parts of the strokes i1003 and i1004 shown in FIG. 10 overlap.

In addition to the construction of the stroke matching unit 3004 that is the same as the matching unit 106 in the first embodiment, the stroke matching unit 3004 is capable of comparing stroke information obtained for the first coordinate string which has been received from the coordinate input unit 105 with only sets of stroke information where the first flag 3103 in the extended stroke dictionary 3001 is set at "1" to find stroke candidates and calculating the evaluation values for the stroke candidates.

When the strokes i1000 to i1007 shown in FIG. 10 are inputted on the coordinate input unit 105, the coordinate input unit 105 notifies the overlap detecting unit 3003 and the stroke matching unit 3004 of the coordinate strings for each of the strokes i1000 to i1007.

The stroke matching unit 3004 finds stroke information for each coordinate string as shown in FIG. 11. The stroke matching unit 3004 compares the first stroke i1000 with each set of stroke information where the first flag 3103 in the extended stroke dictionary 3001 is set at "1" and selects stroke candidates for the stroke i1000. The stroke matching unit 3004 compares the strokes i1001 to i1007, in the same way as the stroke matching unit 106 in the first embodiment, with each set of the stroke information in the extended stroke dictionary 3001 and detects stroke candidates for each of the strokes. As a result, the stroke matching unit 3004 notifies the overlap-based character detecting unit 3005 of the stroke candidates for each of the strokes i1000 to i1007 as shown in FIG. 12.

As it has been given a message stating that the stroke i1004 overlaps a previous stroke, the overlap-based character detecting unit 3005 sets the stroke i1004 as a first stroke and chooses character candidates by searching the character dictionary 102. It should be noted that the overlap-based character detecting unit 3005 has the same functions as the interval-based character detecting unit 108 in the first embodiment for receiving the indications of first strokes, and detects character candidates in almost the same way as the interval-based character detecting unit 108. The overlap-based character detecting unit 3005 notifies the high probability character string detecting unit 3006 of the character candidates shown in FIG. 14.

The high probability character string detecting unit 3006 generates a digraph by combining character candidates without changing the order in which the character candidates received from the overlap-based character detecting unit 3005 appear, and provides each character candidate with a numeric value shown in the probability dictionary 3002.

Figure 33:
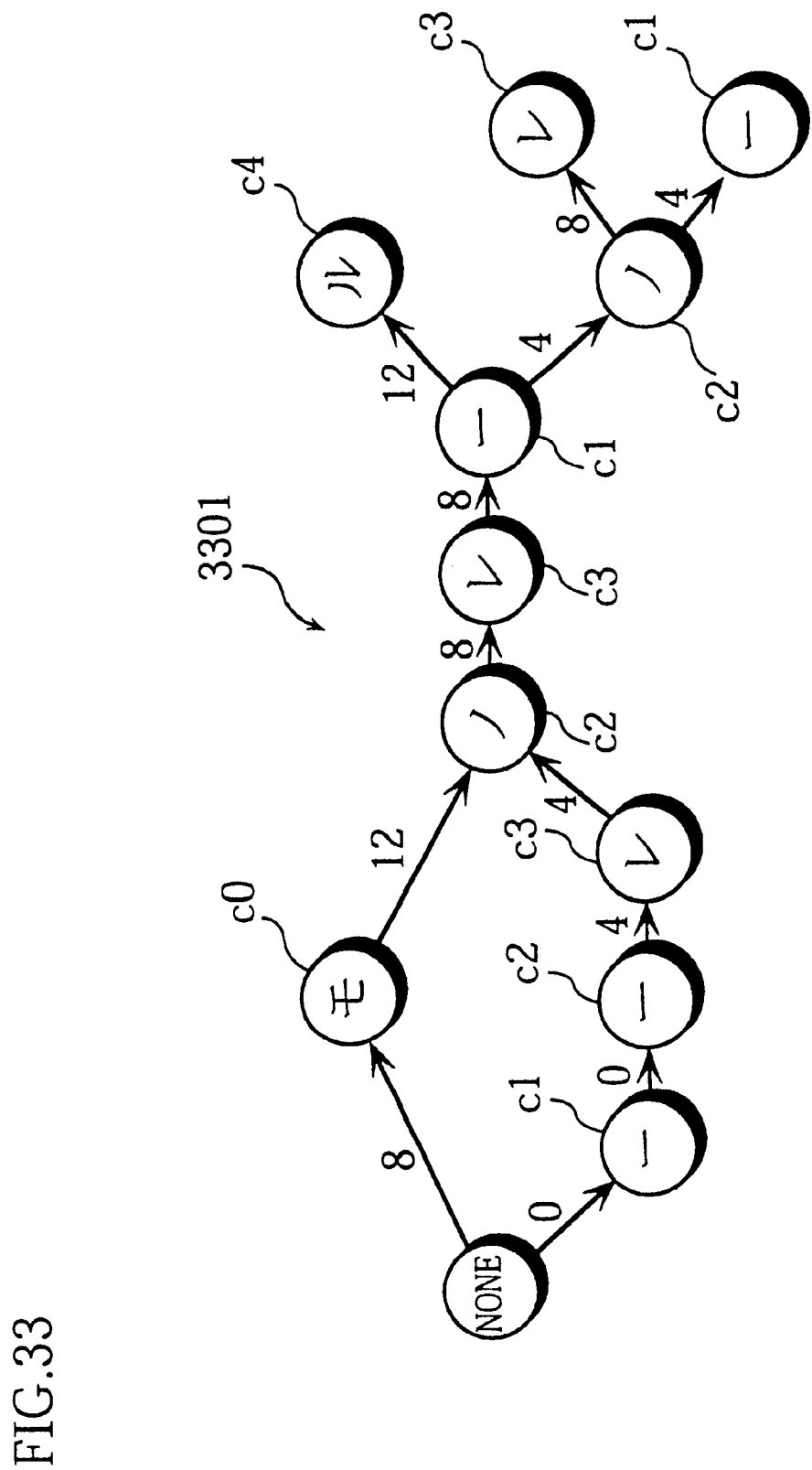
FIG. 33 shows an example of a digraph generated by a high probability character string output unit in the above embodiment.

FIG. 33 shows a digraph 3301 generated by the high probability character string detecting unit 3006.

The high probability character string detecting unit 3006 calculates the mean value for every path in the digraph. The mean value is calculated by summing a numeric value of the probability of each character in a character string on a path being located before another character in the character string and then dividing the sum by the number of characters in the character string. The mean value for a character string "モノレール" is (8+12+8+8+12)/5=9.6. The mean value for a character string "モノレール" is (8+12+8+8+4+8)/6=8.0. The mean value for a character string "モノレーノ" is (8+12+8+8+4+4)/6=7.3. The mean value for a character string "――レノレール" is 5.1. The mean value for a character string "――レノレール" is 4.5. The mean value for a character string "――レノレーノ―" is 4.0. The high probability character string detecting unit 3006 detects the character string "モノレール(monorail)" with the largest mean value as a recognition result of the inputted handwritten characters and notifies the character string output unit 110 of the character string.

Figure 34:
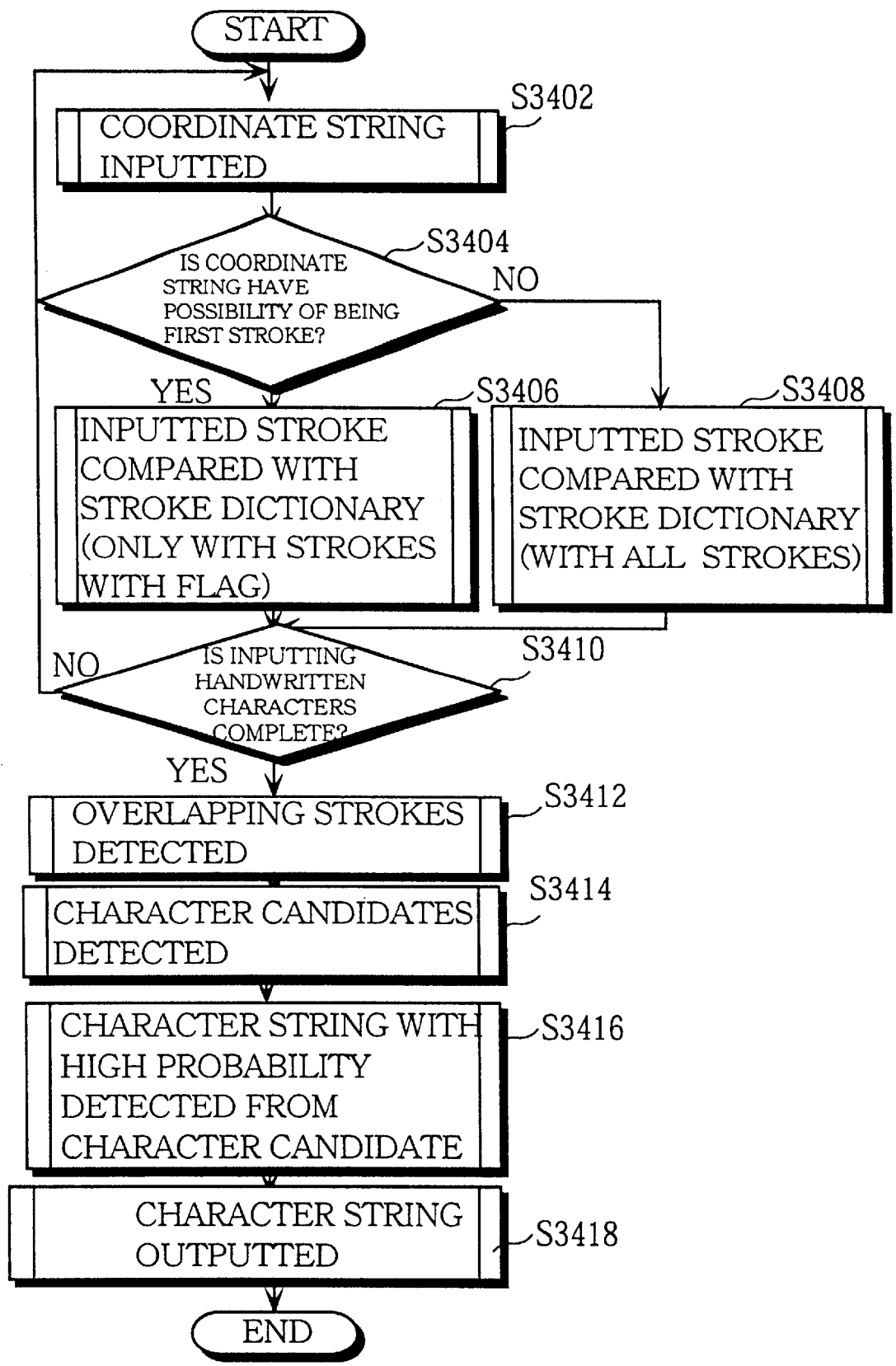
FIG. 34 is a flowchart explaining the operation of the above embodiment.
Figure 35:
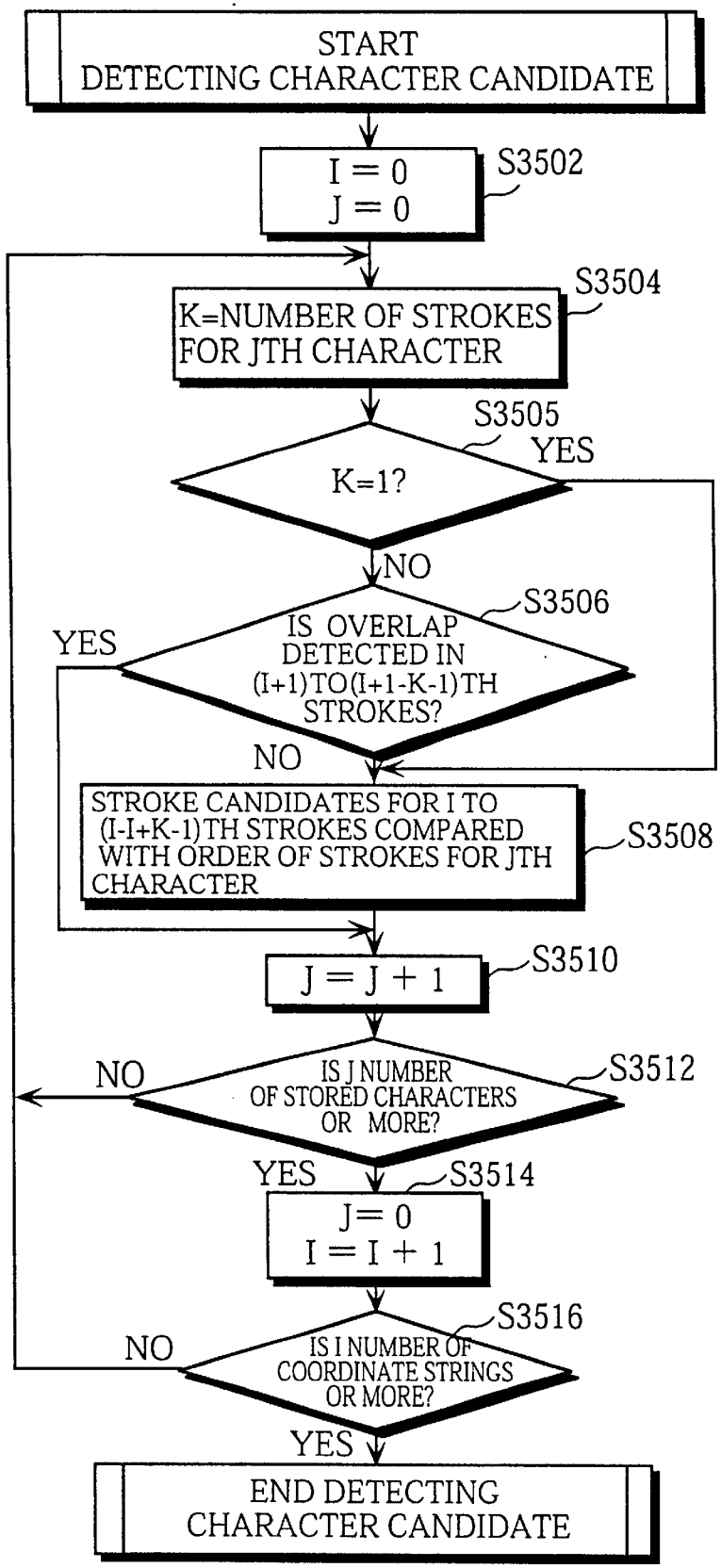
FIG. 35 is a flowchart explaining step S3414 in FIG. 35 in detail in the above embodiment.

The following is an explanation of the operation of the present embodiment with reference to the flowcharts shown in FIGS. 34 and 35.

When a user handwrites characters, the coordinate input unit 105 notifies the stroke matching unit 3004 and the overlap detecting unit 3003 of a coordinate string of each stroke in the handwritten characters (S3402).

The stroke matching unit 3004 finds stroke information for the coordinate string, and judges whether the stroke is a first stroke of a character (S3404). If the stroke is judged to be a first stroke, the stroke matching unit 3004 compares the obtained stroke information with each set of stroke information where the first flag in the extended stroke dictionary 3001 is set at "1", detects stroke candidates for the stroke, and notifies the overlap-based character detecting unit 3005 of the stroke candidates together with the evaluation values (S3406).

If a stroke is judged not to be a first stroke, the stroke matching unit 3004 compares the obtained stroke information with each set of stroke information in the extended stroke dictionary 3001, detects stroke candidates, and notifies the overlap-based character detecting unit 3005 of the stroke candidates together with the evaluation values (S3408). The above process through steps S3402 to S3408 is repeated until the inputting of handwritten characters is complete (S3410).

Next, the overlap detecting unit 3003 judges whether any pair of sequential strokes partly or completely overlap. If the judgement is positive, the overlap detecting unit 3003 informs the overlap-based character detecting unit 3005 of the latter stroke in the pair of overlapping strokes (S3412).

The overlap-based character detecting unit 3005 detects character candidates by comparing the stroke candidates indicated by the stroke matching unit 3004 with the order of strokes for each character in the character dictionary. Here, each stroke indicated by the overlap detecting unit 3003 is set as a first stroke and character candidates are detected (S3414).

The high probability character string detecting unit 3006 generates a digraph using the character candidates detected by the overlap-based character detecting unit 3005, obtains the appearance probability for each character by referring to the probability dictionary 3002, and calculates the mean value of the appearance probability for a character string on each path. The high probability character string detecting unit 3006 choose a path with the highest mean value as a recognition result and notifies the character string output unit 110 of the character string on the path (S3416).

The character string output unit 110 outputs the character string as the recognition result of the inputted handwritten characters (S3418).

FIG. 35 is a flowchart explaining step S3414 in the flowchart shown in FIG. 34 in detail. The operation of the overlap-based character detecting unit 3005 is the same as the interval-based character detecting unit 108 in the first embodiment except for step S3506 which is different from step S1606, so only step S3506 is explained here.

Instep S3506, the overlap-based character detecting unit 3005 judges whether any user stroke that has been detected by the overlap detecting unit 3003 as being a first stroke is included in the I to (I+K−1) th user strokes (S3506).

In the present embodiment, when the overlap detecting unit 3003 detects overlapping strokes, the overlap detecting unit 3003 notifies the overlap-based character detecting unit 3005 of the latter of the overlapping strokes. However, it may be better for the overlap detecting unit 3003 may also notify the stroke matching unit 3004. By doing so, when the stroke matching unit 3004 compares stroke information for a coordinate string of each stroke with each set of stroke information in the extended stroke dictionary 3001, the stroke matching unit 3004 is able to compare the stroke information only with each set of stroke information where the first flag is set at "1". This will enable the apparatus to detect stroke candidates more easily.

Fourth Embodiment

Figure 36:
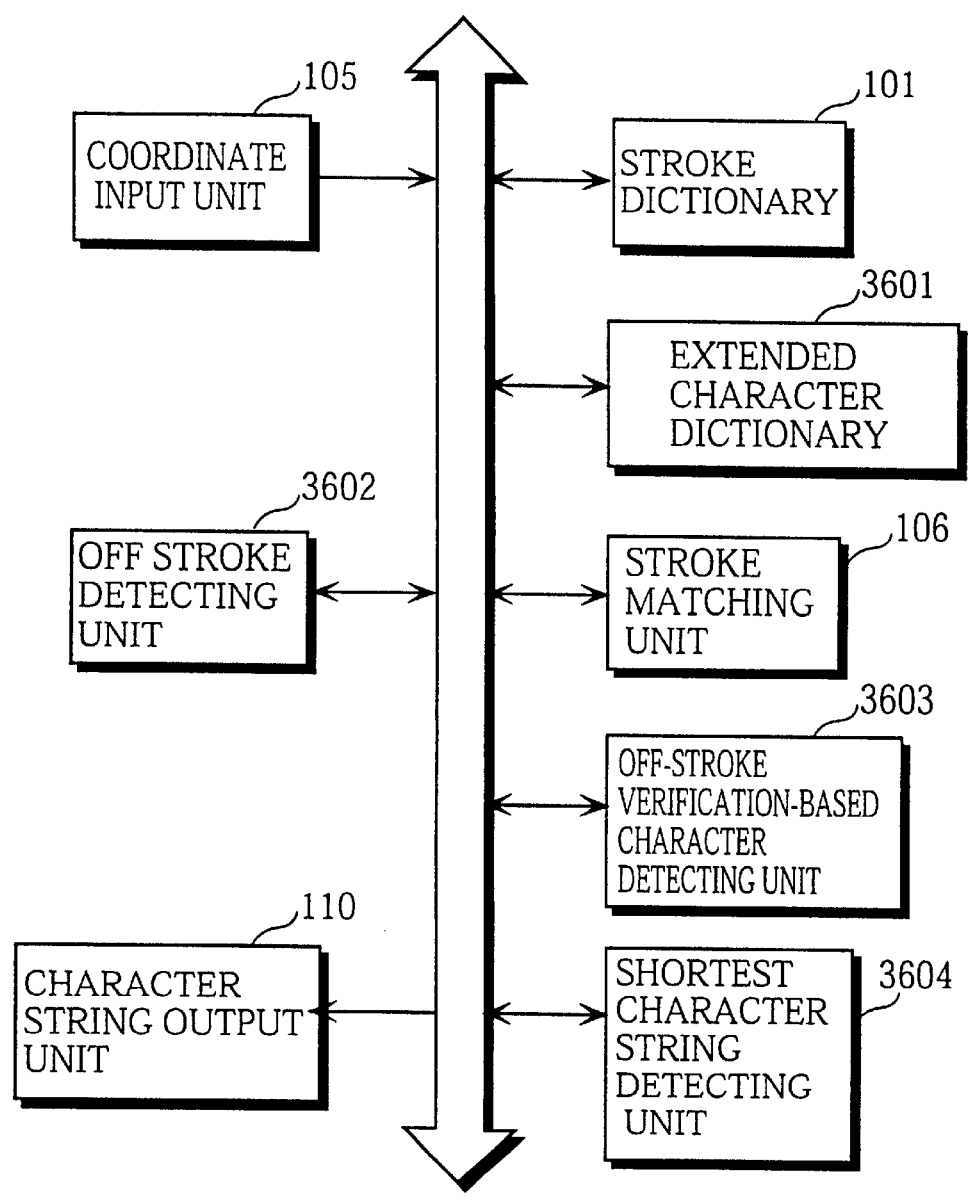
FIG. 36 shows the construction of a character input apparatus in the fourth embodiment of the present invention.

FIG. 36 shows the construction of a character input apparatus in the fourth embodiment of the present invention. The character input apparatus is made up of a stroke dictionary 101, an extended character dictionary 3601, a coordinate input unit 105, an off-stroke detecting unit 3602, a stroke matching unit 106, an off-stroke verification-based character detecting unit 3603, a shortest character string detecting unit 3604, and a character string output unit 110.

It should be noted that the elements that are the same as those of the character input apparatus in the first embodiment are indicated by the same numbers and are not explained in the present embodiment. The following is an explanation of the elements unique to the present embodiment.

Figure 37:
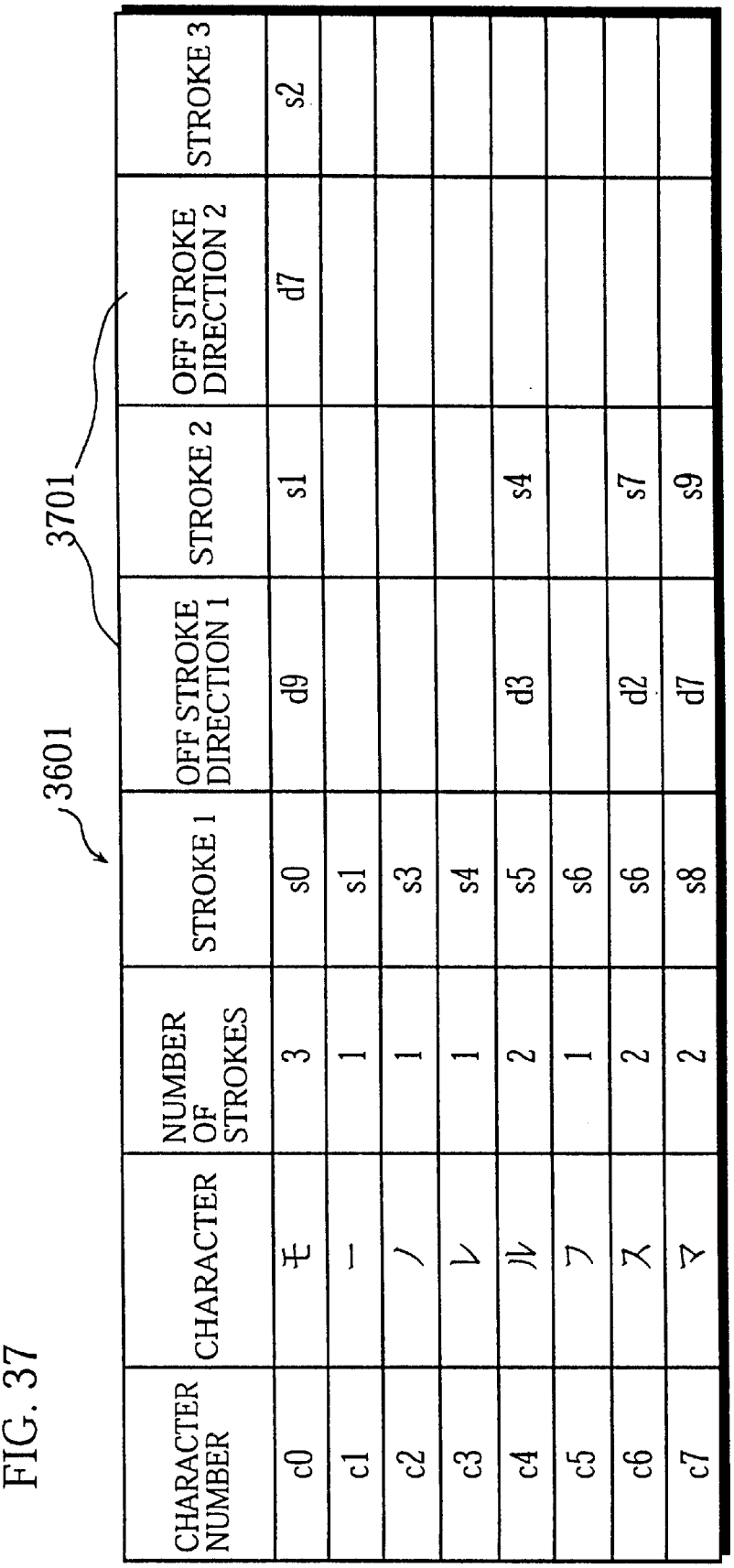
FIG. 37 shows an example of the content of an extended character dictionary in the above embodiment.

As shown in FIG. 37, the extended character dictionary 3601 stores not only information for each character, the number and the order of strokes that constitute each character as in the character dictionary 102 in the first embodiment, but also off-stroke information 3701 about the relationship between the strokes composing a character that includes 2 or more strokes. In the present embodiment, the off-stroke information 3701 shows the direction from the end point of one stroke to the start point of a following stroke using the quantized directions shown in FIG. 5. An "off-stroke" here means an interval where a stylus is lifted from the tablet 201 between two sequential strokes when inputting characters.

When a user inputs characters by handwriting, the coordinate input unit 105 notifies the stroke matching unit 106 and the off-stroke detecting unit 3602 of a coordinate string for each inputted stroke in the handwritten characters.

The stroke matching unit 106 finds stroke information for each stroke of the coordinate string, compares the obtained stroke information with each set of stroke information in the stroke dictionary 101, detects stroke candidates, and notifies the off-stroke verification-based character detecting unit 3603 of the stroke candidates.

Figure 38:
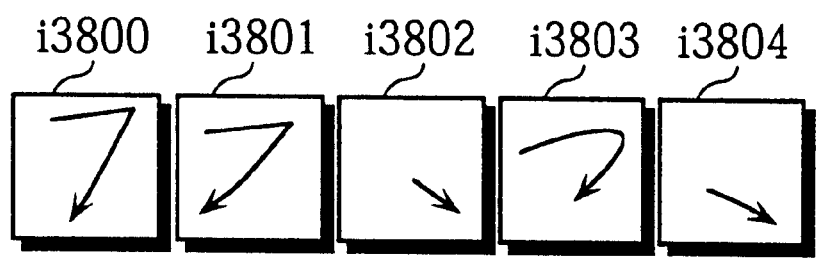
FIG. 38 shows specific examples of strokes inputted on a coordinate input unit in the above embodiment.

The off-stroke detecting unit 3602 prestores the quantized directions shown in FIG. 5. When a plurality of coordinate strings have been received from the coordinate input unit 105, the off-stroke detecting unit 3602 detects the direction of each off-stroke between two strokes from a coordinate of the end point of a stroke and a coordinate of the start point of a following stroke. The off-stroke detecting unit 3602 notifies the stroke verification-based character detecting unit 3603 of the detected direction of each off-stroke. Now, the strokes i3800 to i3804 shown in FIG. 38 are inputted one after another on the coordinate input unit 105. The stroke matching unit 106 finds stroke information for each stroke from the coordinate string of the stroke received from the coordinate input unit 105. The obtained stroke information 3901 is shown in FIG. 39. The stroke matching unit 106 then compares the stroke information for a user stroke with each set of stroke information in the stroke dictionary 101, detects stroke candidates for the user stroke, and notifies the off-stroke verification-based character detecting unit 3603 of the stroke candidates together with the evaluation values. The stroke candidates for each of the strokes i3800 to i3804 are shown in FIG. 40.

The off-stroke detecting unit 3602 numbers the off-strokes between the strokes i3800 to i3804 in order of stroke numbers, and detects directions of off-strokes one after another. The direction of the off-stroke o4100 between the strokes i3800 and i3801 is "d5", which is the direction from the endpoint of the stroke i3800 to the start point of the stroke i3801. In the same way, the direction of the off-stroke o4101 between the strokes i3801 and i3802 is "d1". The detected off-stroke information 4104 is shown in FIG. 41. The off-stroke detecting unit 3602 notifies the off-stroke verification-based character detecting unit 3603 of the off-stroke information 4104.

When the stroke candidates have been received from the stroke matching unit 106 and the off-stroke information for user strokes have been received from the off-stroke detecting unit 3602, the off-stroke verification-based character detecting unit 3603 compares the stroke candidates with the order of strokes for each character registered in order of the character number in the extended character dictionary 3601, and also compares the off-stroke information for user strokes with off-stroke information for each character registered in order of character numbers in the extended character dictionary 3601. Here, when the direction of an off-stroke between strokes in the extended character dictionary 3601 differs from the direction of the corresponding off-stroke between stroke candidates for user strokes by at least a predetermined angle, the off-stroke verification-based character detecting unit 3603 judges that the stroke candidates cannot be the strokes that constitute the character in the extended character dictionary 3601.

When the stroke candidates shown in FIG. 40 and the off-stroke information shown in FIG. 41 have been received, the off-stroke verification-based character detecting unit 3603 compares the stroke candidates and the off-stroke information with the order of strokes and off-stroke information for each character in the extended character dictionary 3601 starting from the character "モ" with the character number "c0". The character "モ" is composed of "3" strokes, the direction of the off-stroke 1 for the character "モ" is "d9" and the direction of the user off-stroke o4100 is "d5". These directions differ by at least a predetermined angle (for example, 90°), so the stroke candidates are judged not to be the character "モ" with the character number "c0". Each of the characters with the character numbers "c0" to "c3" in the extended character dictionary 3601 has only one stroke, so the user off-stroke information is not used.

The character "フ" with the character number "c5" matches the stroke candidate "s6" for the stroke i3800, so the character "フ" is chosen as a character candidate.

The character "ス" with the character number "c6" has "2" strokes. The direction "d5" of the user off-stroke o4100 is compared with the direction "d2" of the off-stroke 1 in the extended character dictionary 3601. The difference in angle between the pair of off-strokes is less than 90°, so the next judgement is performed as to whether the second stroke "s7" in the order of strokes in the extended character dictionary 3601 is included in the stroke candidates for the stroke i3801. However, the evaluation values for all the stroke candidates for the stroke i3801 are a predetermined value of "10" or more, so the character "ス" is not chosen as a character candidate. The matching process moves to the next character "マ" with the character number "c7". The difference in angle between the direction of the off-stroke 1 "d7" in the extended character dictionary 3601 and the direction "d5" of the corresponding user off-stroke o4100 is less than 90°, so the next judgement is performed as to whether the second stroke "s9" in the extended character dictionary 3601 is included in the stroke candidates for the stroke i3800. However, the evaluation values for all the stroke candidates for the stroke i3800 are a predetermined value or more, so the character "マ" is not chosen as a character candidate.

Next, the stroke i3801 is set as a first character, and the user strokes are compared with characters in the extended character dictionary 3601 starting from the character number "c0".

As a result of this, the character "フ" with the character number "c5" is chosen for the stroke i2901 as a character candidate. As the difference in angle between the direction of an off-stroke 1 "d2" for the character number "c6" in the extended character dictionary 3601 and the direction "d1" for the corresponding user off-stroke o4101 is less than 90°, the character "ス" is chosen as a character candidate for the stroke candidates "s6" and "s7" for the user strokes i2901 and i2902.

In the same way, the character "フ" with the character number "c5 " for the user stroke i2903, the long vowel mark "—" with the character number "c1" for the user stroke i2904, and the character "マ" with the character number "c7" for the user strokes i2903 and i2904 are chosen as character candidates.

The off-stroke verification-based character detecting unit 3603 notifies the shortest character string detecting unit 3604 of the character candidates shown in FIG. 42.

When the character candidates have been received from the off-stroke verification-based character detecting unit 3603, the shortest character string detecting unit 3604 generates character strings by combining the stroke candidates for the user strokes i3800 to i3804 respectively, detects the shortest character string (consisting of the smallest number of characters) out of the generated character strings, and notifies the character string output unit 110 of the character string.

The character strings "フスフ—" and "フスマ" are generated by combining the character candidates shown in FIG. 42, and the shorter character string "フスマ" is chosen as a recognition result.

Figure 43:
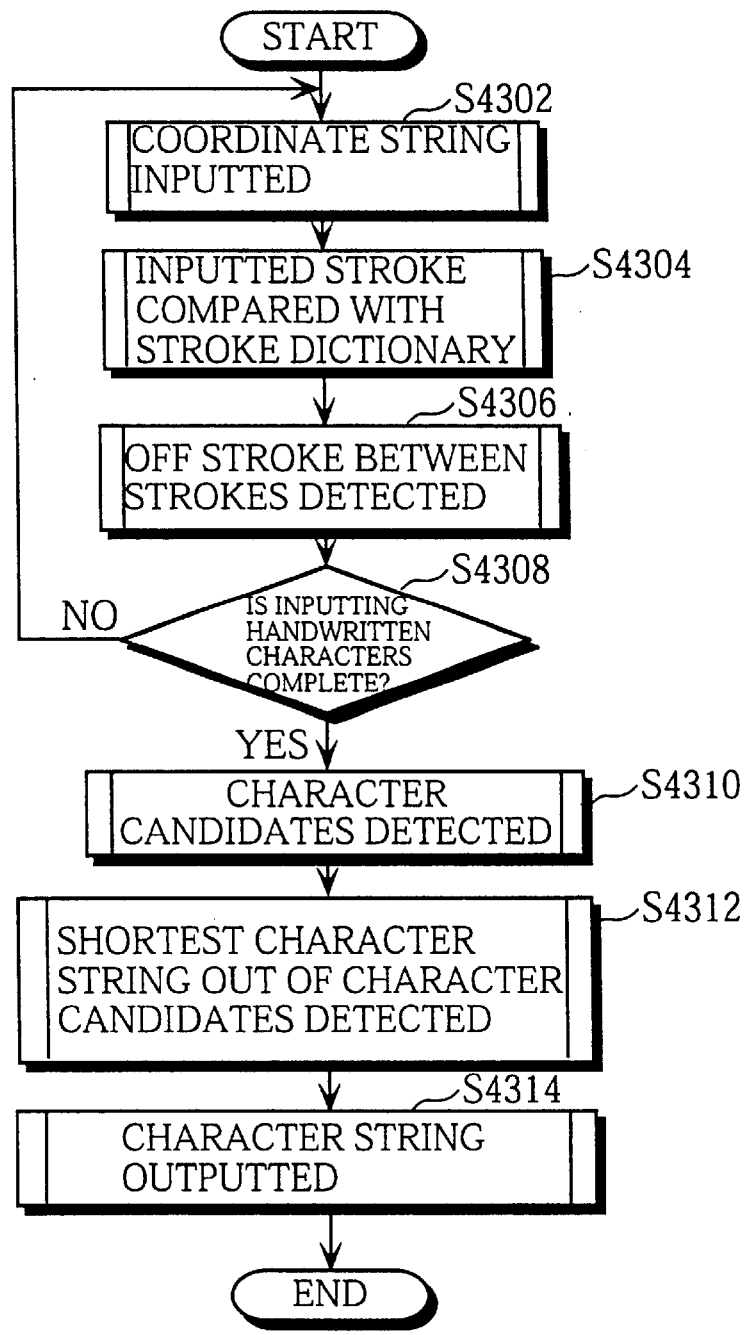
FIG. 43 is a flowchart explaining the operation of the above embodiment.
Figure 44:
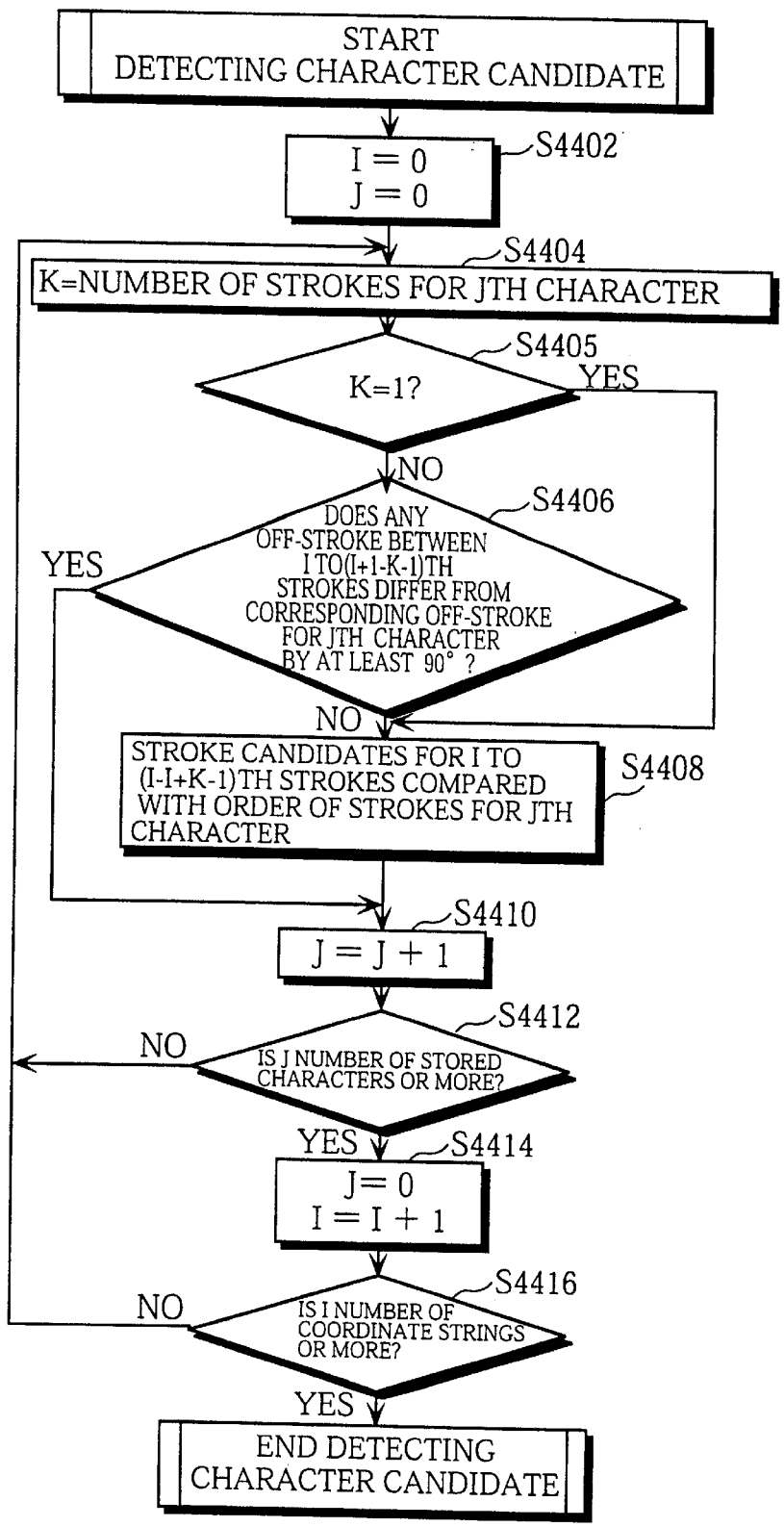
FIG. 44 is a flowchart explaining step S4310 in FIG. 43 in detail in the above embodiment.

The following is an explanation of the operation of the present embodiment with reference to the flowcharts shown in FIGS. 43 and 44. It should be noted that steps S1502 and S1504 in the first embodiment are the same as steps S4302 and S4304 in the present embodiment respectively, step S1508 is the same as step S4308, and step S1514 is the same as step S4314. These steps are not explained in the present embodiment.

The off-stroke detecting unit 3602 detects the direction of an off-stroke from the end point of one stroke to the start point of a following stroke from coordinate strings of these strokes received from the coordinate input unit 105, and notifies the off-stroke verification-based character detecting unit 3603 of the direction of the off-stroke (S4306)

The off-stroke verification-based character detecting unit 3603 detects character candidates (S4310). This step is explained in detail in the flowchart in FIG. 44.

The shortest character string detecting unit 3604 generates character strings by combining character candidates received from the off-stroke verification-based character detecting unit 3603 without changing the order in which the character candidates appear, and detects a character string which has the smallest number of characters as the recognition result (S4312).

FIG. 44 shows a detailed explanation of the process of detecting character candidates. The following is an explanation of step S4406 as it differs from step S1606 in the first embodiment.

In step S4406, the off-stroke verification-based character detecting unit 3603 judges whether the direction of any of the off-strokes between the I to (I+K−1) th user strokes received from the stroke matching unit 106 and the direction of the corresponding off-stroke of the Jth character in the extended character dictionary 3601 differs by at least an angle of 90°. If the judgement is positive, the Jth character cannot be a character candidate. The processing advances to step S4410. If the judgement is negative, the processing moves to step S4408 and each combination of stroke candidates for the user strokes are compared with the order of strokes for the Jth character in the extended character dictionary 3601.

It should be noted that the direction of an off-stroke is used as off-stroke information in the present embodiment, however, the length of an off-stroke, which is the distance between the end point of one stroke and the start point of a following stroke may be registered in the extended character dictionary as off-stroke information. If so, the off-stroke detecting unit calculates the length of an off-stroke between inputted user strokes and notifies the off-stroke verification-based character detecting unit of the length. The off-stroke verification-based character detecting unit then judges whether the difference between the length of a registered off-stroke and the received length of a user off-stroke is within a predetermined range, and if not, does not choose the registered character as a character candidate.

Fifth Embodiment

A character input apparatus in the fifth embodiment of the present invention is almost the same as the one in the first embodiment. The difference is that the interval detecting unit 107 is omitted from the construction, and the contents of the stroke dictionary 101, the character dictionary 102, and the word dictionary 103 are changed to handle the handwritten alphabet.

The present embodiment is mainly explained by focusing on the above differences, with reference to specific examples when handwritten alphabets are inputted. It should be note here that the elements that are the same as in the first embodiment are indicated by the same numbers and are not explained in the present embodiment.

FIG. 45 shows an example of the content of the stroke dictionary. The stroke dictionary 4501 stores stroke information for strokes that constitute the alphabet and are identified by stroke numbers shown by each stroke number 4502. The stroke information includes area information consisting of the start area 4503 and the end area 4504 that indicate areas where each stroke starts and ends respectively.

The stroke information further includes direction information consisting of directions 4505 showing the direction from the start point to the end point of a stroke (a number of directions may be given) and the number of the directions 4506.

Figure 46:
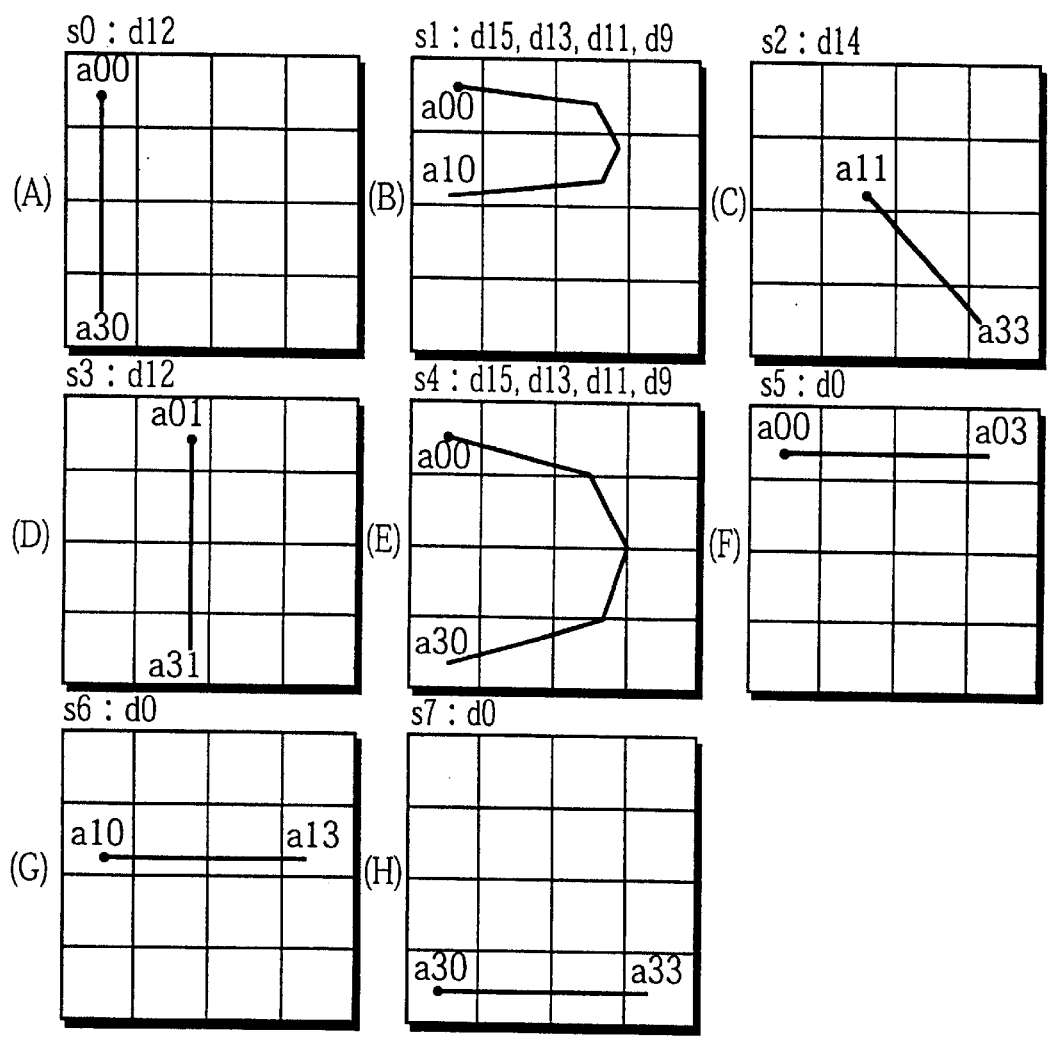
FIGS. 46(A)–(H) show specific examples of the strokes in the stroke dictionary in the above embodiment.
Figure 48:
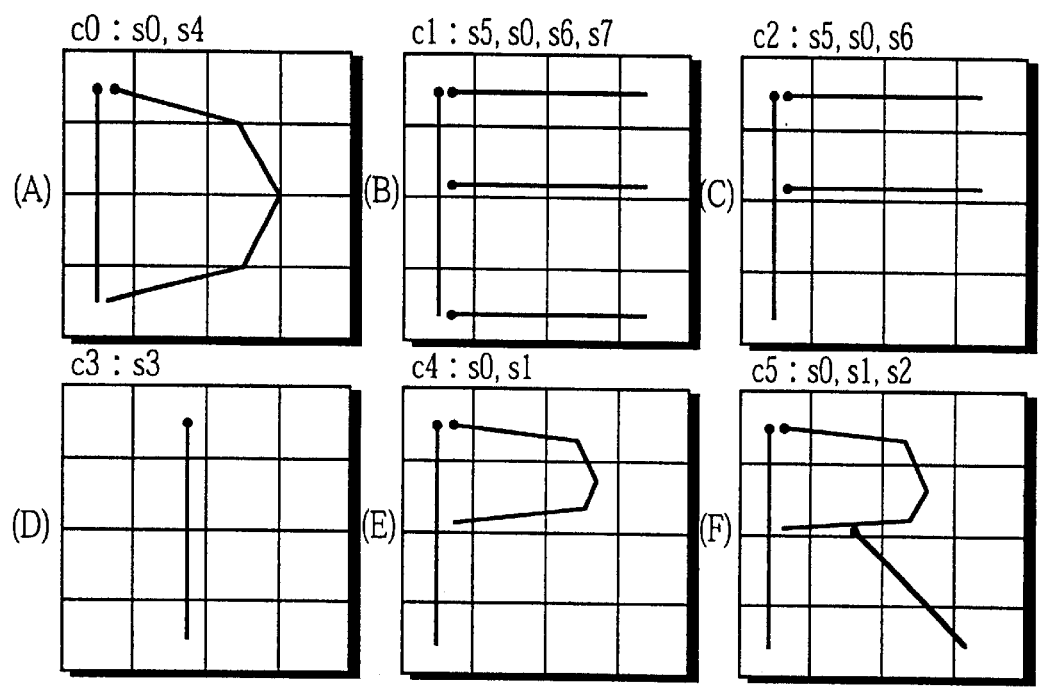
FIGS. 48(A)–(F) show specific examples of the characters in the character dictionary in the above embodiment.

FIGS. 46A to 46H show specific examples of the strokes registered with the stroke numbers "s0" to "s7". The start points of the strokes are marked with "—" to differentiate them from the end points. In FIG. 46A, the stroke with the stroke number "s0" is expressed using the start area "a00", the end area "a30", and the direction "d12". The stroke is almost a straight line with no change in direction between the start point and the end point. Therefore, the number of directions 4506 is "1". The strokes in FIGS. 46C, 46D, 46F, 46G and 46H also have "1" direction as shown in the number of directions 4506.

In FIG. 46B, the stroke with the stroke number "s1" is expressed using the start area "a00", the end area "a10", and the direction string "d15, d13, d11, d9". The direction of the stroke changes almost 180° between the start point and the end point of the stroke, and the number of directions 4506 is "4". The stroke with the stroke number "s4" in FIG. 46E is expressed using the start area "a00", the end area "a30", and the direction string "d15, d13, d11, d9". The number of directions 4506 is "4".

As explained above, the stroke dictionary 4501 stores stroke information for each stroke that constitutes characters (of the alphabet). The stroke information includes areas on the tablet 201 and directions of each stroke.

FIG. 47 shows an example of the content of the character dictionary. The character dictionary 4701 shows the alphabet and includes character numbers 4702 for identifying characters, characters 4703 for showing the corresponding characters, numbers of strokes 4704 that constitute characters, and orders of strokes 4705. Stroke numbers are used for identifying strokes. Specific examples of the characters numbered with the character numbers "c0" to "c5" are shown in FIGS. 48A to 48F.

The characters referred to here include marks such as a question mark "?".

FIG. 49 shows an example of the content of the word dictionary. The word dictionary 4901 stores word numbers 4902 for identifying words, numbers of characters 4903 that constitute words, and orders the characters 4904.

Figure 50:
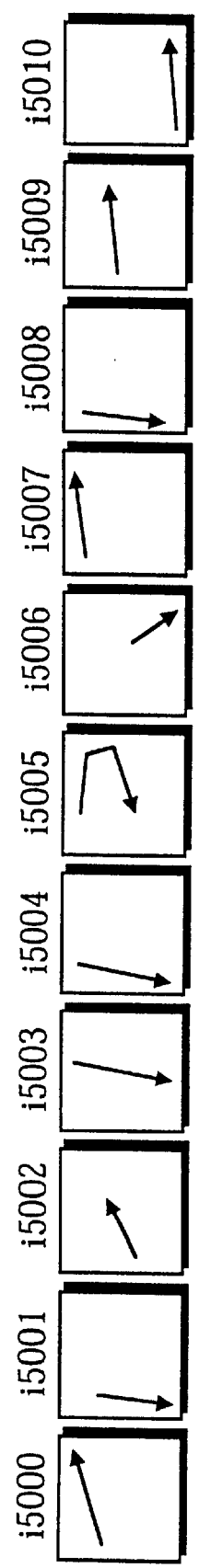
FIG. 50 shows specific examples of the strokes inputted on a coordinate input unit in the above embodiment.

When a user inputs characters by handwriting as shown in FIG. 50 on the tablet 201 using the stylus 204, the coordinate input unit 105 notifies the stroke matching unit 106 of a coordinate string of each of the user strokes i5000 to i5010. The stroke matching unit 106 obtains stroke information for each of the inputted user strokes. As a result, the stroke information for the strokes i5000 to i5010 handwritten by the user is obtained as shown in FIG. 51. It should be noted that the arrows in FIG. 50 signify the end points of the strokes.

The stroke matching unit 106 then compares stroke information for each of the strokes i5000 to i5010 with each set of stroke information in the stroke dictionary 4501, finds the closely matching strokes as stroke candidates, and notifies the interval-based character detecting unit 108 of the stroke candidates. The stroke candidates are shown in FIG. 52. In FIG. 52, the five stroke candidates sc0 to sc4 for each of the strokes i5000 to i5010 are respectively expressed using stroke numbers. The numeric value in parenthesis added to each stroke number signifies the evaluation value for each stroke candidate.

For instance, the stroke candidates for the stroke i5000 are shown in order of matching degree as "s6", "s5", "s7", "s2", and "s3". The same is true of the other strokes i5001 to i5010.

When user stroke numbers and stroke candidates for each user stroke shown in FIG. 52 have been received from the stroke matching unit 106, the interval-based character detecting unit 108 ignores the stroke candidates with an evaluation value of "10" or more. As a result, the remaining stroke candidates are the stroke candidates "sc0", and "sc1" for all the strokes, the stroke candidates "sc2" for the strokes i5002, i5009, and i5010, and the stroke candidate "sc3" for the stroke i5009 in FIG. 52. The stroke numbers of these stroke candidates are compared with the stroke numbers of strokes in characters shown in the order of strokes 4705 in the character dictionary 4701.

The following is a detailed explanation of the operation of the interval-based character detecting unit 108 with reference to FIG. 52. The interval-based character detecting unit 108 judges whether the stroke number of any of the stroke candidates for the stroke i5000 matches the stroke number of strokes in characters in the character dictionary 4701 by checking one character at a time starting with the character with the character number "c0". The character "D" with the character number "c0" has "2" strokes. Therefore, the interval-based character detecting unit 108 judges whether the stroke numbers of any combination of the stroke candidates for the stroke string i5000 to i5001 matches the stroke numbers of strokes in the character "D" shown in the order of strokes 4705. However, no combination of the stroke numbers "s6" and "c0" of the stroke candidates "sc0" and the stroke numbers "s5" and "s3" of the stroke candidates "sc1" respectively matches the stroke number "s0" of the stroke 1 and the stroke number "s4" of the stroke 2. Therefore, the character "c0 (D)" is not chosen as a character candidate.

The character "E" with the character number "c1" in the character dictionary 4701 has "4" strokes, therefore, the judgement is performed as to whether the stroke number of any combination of the stroke candidates for the stroke string i5000 to i5003 matches the stroke number of strokes in the character "E" shown in the order of strokes 4705. The stroke candidate "sc1" for the stroke i5000, the stroke candidate "sc0" for the stroke i5001, and the stroke candidate "sc0" for the stroke i5002 respectively match the stroke number "s5" of the stroke 1, the stroke number "s0" of the stroke 2, the stroke number "s6" of the stroke 3, but the stroke number of none of the stroke candidates for the stroke i5003 matches the stroke number "s7" of the stroke 4. Therefore, the character "E" with the character number "c1" is not chosen as a character candidate either.

The character "F" with the character number "c2" in the character dictionary 4701 has "3" strokes, therefore, the judgement is performed as to whether the stroke numbers of any combination of the stroke candidates for the stroke string i5000 to i5002 matches the stroke numbers "s5", "s0", and "s6" of strokes in the character "F" shown in the order of strokes 4705. The stroke candidate "sc1" for the stroke i5000, the stroke candidate "sc0" for the stroke i5001, the stroke candidate "sc0" for the stroke i5002 respectively match the strokes 1, 2, and 3, therefore, the character "c2 (F)" is chosen as a character candidate.

The character "c2 (F)" is chosen for the strokes i5000 to i5002. However, the stroke number of the stroke in the character "I" with the character number "c3" in the character dictionary 4701 matches the stroke number "s3" of the stroke candidate "sc1" for the stroke i5001, so this character "c3 (I)" is also chosen as a character candidate.

The character "c3 (I)" is chosen for the stroke i5003.

In the above described way, the interval-based character detecting unit 4901 detects character candidates for each stroke and combinations of strokes as shown in FIG. 53. When the detecting is complete, the interval-based character detecting unit 4901 notifies the word detecting unit 109 of these character candidates.

When the character candidates have been received from the interval-based character detecting unit 4901, the word detecting unit 109 detects words by referring to the word dictionary 4901.

When the character candidates shown in FIG. 53 have been received, the word detecting unit 109 searches the word dictionary 4901 for a word that has the character "F" as a first character. The character "F" is the character candidate for the strokes i5000 to i5002. The word dictionary 4901 includes a word w1 which has the character candidate "F" as a first character. If a character string for the word w1 matches a string composed of character candidates for the user strokes i5000 to i5010, the word w1 is detected. The word w1 is composed of four characters, with the remaining characters being compared one at a time with a string of character candidates starting from the character candidates for the stroke i5003. The character candidate cc0 "I" for the stroke i5003, the character candidate cc2 "R" for the strokes i5004 to i5006 and the character candidate cc0 "E" for the strokes i5007 to i5010 match the word w1, so the word w1 "FIRE" is detected. As the word dictionary 4901 includes no other words that have the character "F" as a first character, the detecting ends. If the word dictionary 4901 includes other words that have the character "F" as a first character, combinations of the character candidates for the stroke i5003 and the following strokes are examined.

The word detecting unit 109 notifies the character string output unit 110 of the detected word.

The character string output unit 110 displays the word on the display screen 203 and at the same time stores the word onto a storage medium (not illustrated).

The operation of the present embodiment will not be explained as it is the same as the flowcharts in FIGS. 15 and 16 showing the operation of the first embodiment, except that step S1506 in FIG. 15 is omitted from the present embodiment.

It should be noted that, for example, an apparatus with the present invention can help a user input characters correctly if constructed to display the most recently inputted coordinate strings on the LCD tablet at certain intervals or whenever a certain number of strokes have been inputted when a user handwrites characters on the LCD tablet using a stylus.

If the apparatus starts searching for characters when a certain number of coordinate strings are inputted, and if the apparatus outputs a detected character string while a user is writing, the user will be able to handwrite characters more smoothly as he/she can check the inputted characters.

If the apparatus is equipped with an interface for displaying character string candidates from which a user can select a desired character string, the apparatus will be able to correct mistakenly detected characters more easily.

If the apparatus is equipped with an interface for a user to select a range of mistakenly detected characters, the apparatus will be able to correct the mistakenly detected characters more efficiently.

If the apparatus is equipped with an interface for a user to re-enter coordinate strings for the selected range of the characters, the apparatus will be able to correct mistakenly handwritten characters more easily.

When a user inputs coordinate strings for the selected range of the characters using a keyboard, the apparatus can be equipped with an interface that automatically registers originally inputted coordinate strings for the user's handwriting in learning mode. By doing so, the apparatus will be able to learn handwritten characters more efficiently.

The apparatus may be equipped with an interface that constructs a stroke dictionary and a character dictionary specialized for a user, into which the user writes all or parts of his/her handwriting patterns of characters in learning mode when using the apparatus for the first time. In this case, the apparatus will be able to recognize inputted handwritten characters more accurately.

The above embodiments 1 to 4 explain the case where katakana characters are handwritten, and the embodiment 5 explains the case where letters of the alphabet are handwritten. However, if sets of stroke information for strokes that constitute numbers, hiragana letters, and Chinese characters are registered in the stroke dictionary 101, the order of strokes for those characters are registered in the character dictionary 102, and words that are composed of those characters are registered in the word dictionary 103, not only katakana characters and the alphabet but also Chinese characters and the others will be recognized by the apparatus.

The directions of strokes are expressed using the 16 quantized directions shown in FIG. 5, but it is also possible to use other information.

The start/end points of strokes are indicated using the 16 areas on the handwriting input screen divided into 4 vertically and horizontally, but it is also possible to use other information.

To convert a coordinate string into stroke information, a direction string as shown in FIG. 5 is first acquired from the coordinate string using a conventional segment method, and areas are then acquired by judging which areas in FIG. 4 include the start/end point of the coordinate string, but it is also possible to use other methods.

The matching of stroke candidates is performed using evaluation values determined by a simple sum of matching evaluation values between directions of pairs of strokes, between start points of pairs of strokes, and between end points of pairs of strokes. However, the evaluation values for stroke candidates may also be determined by a result of an arithmetic expression, such as multiplication of each evaluation value by an appropriate coefficient.

An evaluation value between pairs of direction strings is determined by matching the pairs of direction strings using DP matching method, but it is also possible to use other methods.

The city block distance between pairs of start points is used as an evaluation value between the pairs of start points, but it is also possible to use other methods.

The city block distance between pairs of end points is used as an evaluation value between the pairs of end points, but it is also possible to use other methods.

When detecting character candidates, stroke candidates with an evaluation value of 10 or more are ignored, but other standards may be used for eliminating stroke candidates.

Needless to say, combining the present invention with a technology for converting characters from hiragana characters to Chinese characters will give rise to a better environment for inputting characters when writing in Japanese.

In the above embodiments, the construction of the character input apparatus is described for the example construction shown in FIG. 1 and drawings. However, it is also possible to have a computer-readable storage medium store programs (program code) that have a computer execute the functions of each. By applying the storage medium to a character input apparatus without functions for recognizing characters drawn one after another in a single character input frame, it is possible to make the apparatus demonstrate an equivalent effect to the character input apparatus of the present invention.

Although the present invention has been fully described byway of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A character input apparatus comprising:

a stroke dictionary in which sets of standard stroke information for a plurality of strokes are registered, each of the sets of standard stroke information corresponding to a different stroke;

a character dictionary in which stroke orders for a plurality of characters are registered, each of the stroke orders corresponding to a different character;

a coordinate output unit operable to output, when a user inputs handwritten characters, a coordinate string comprising sets of coordinates of points for each handwritten stroke comprising the handwritten characters;

a stroke matching unit operable to obtain stroke information for each of the handwritten strokes from the outputted coordinate string of the handwritten strokes, compare the stroke information with each of the sets of standard stroke information registered in said stroke dictionary, and output a plurality of stroke candidates; and a character detecting unit operable to search said character dictionary using an order of a group of the stroke candidates obtained in inputted order by said stroke matching unit as a key and detect a character whose stroke order matches the order of the stroke candidates.

2. The character input apparatus of claim 1, wherein the standard stroke information includes a start position, an end position, each direction, and a number of directions for each stroke, and wherein said stroke matching unit comprises:

a stroke information obtaining unit operable to obtain the stroke information which includes a start position, an end position, each direction, and a number of directions for a stroke from the outputted coordinate string of the handwritten strokes;

a stroke candidate output unit operable to compare the obtained stroke information with each of the sets of standard stroke information and output the plurality of stroke candidates; and an evaluation value adding unit operable to add an evaluation value to each of the plurality of stroke candidates according to a degree of matching between the obtained stroke information and the standard stroke information of each of the plurality of stroke candidates, and wherein said character detecting unit comprises:

a character candidate detecting unit operable to ignore stroke candidates with the evaluation value showing a poor match and detect character candidates using remaining stroke candidates; and a correct character detecting unit operable to detect a correct character out of the detected character candidates.

3. The character input apparatus of claim 2, further comprising a coordinate string detecting unit operable to detect coordinate strings, out of the coordinate strings outputted by said coordinate output unit, that are inputted at least a predetermined time after an immediately preceding coordinate string, wherein said character candidate detecting unit detects the character candidates by setting the stroke candidates corresponding to the coordinate strings detected by said coordinate string detecting unit as first strokes of characters.

4. The character input apparatus of claim 3, wherein said correct character detecting unit comprises:

a word dictionary in which character orders for a plurality of words are registered, each of the character orders corresponding to a different word; and a word detecting unit operable to detect, when either one of the character candidates detected by said character candidate detecting unit or a combination of the character candidates is registered in said word dictionary, a corresponding word as the inputted handwritten characters.

5. The character input apparatus of claim 2, further comprising:

a word dictionary in which character orders for a plurality of words are registered, each of the character orders corresponding to a different word; and a word detecting unit operable to detect, when either one of the character candidates detected by said character candidate detecting unit or a combination of the character candidates is registered in said word dictionary, a corresponding word as the inputted handwritten characters.

6. The character input apparatus of claim 2, wherein said correct character detecting unit comprises:

a probability dictionary for showing a numeric value of a probability of each pair of adjacent characters appearing in a character string;

a high probability character detecting unit operable to generate character strings by combining the character candidates detected by said character candidate detecting unit without changing an order of the character candidates, calculate a value for each of the character strings by summing up the numeric values of the probability for pairs of adjacent characters that constitute a character string and dividing the sum by a number of characters that constitute the character string, and detect a character string with a highest value as the inputted handwritten characters.

7. The character input apparatus of claim 1, further comprising a coordinate string detecting unit operable to detect coordinate strings, out of the coordinate strings outputted by said coordinate output unit, that are inputted at least a predetermined time after an immediately preceding coordinate string, wherein said character detecting unit comprises:

a character candidate detecting unit operable to detect a plurality of character candidates by setting the plurality of stroke candidates corresponding to the coordinate strings detected by said coordinate string detecting unit as first strokes of characters; and a correct character detecting unit operable to detect the character as a correct character out of the plurality of detected character candidates.

8. The character input apparatus of claim 1, wherein said character detecting unit comprises:

a character candidate detecting unit operable to detect a plurality of character candidates;

a word dictionary in which character orders for a plurality of words are registered, each of the character orders corresponding to a different word; and a word detecting unit operable to detect, when either one of the character candidates detected by said character candidate detecting unit or a combination of the character candidates is registered in said word dictionary, a corresponding word as the inputted handwritten characters.

9. The character input apparatus of claim 1, wherein said character input apparatus is operable to be set to a learning mode for learning handwritten characters, wherein when said character input apparatus is in learning mode, said stroke matching unit adds an evaluation value to each stroke candidate according to a degree of matching between the obtained stroke information and the standard stroke information of the stroke candidate registered in said stroke dictionary, and wherein said character input apparatus further comprises:
    a stroke dictionary additional register unit operable to additionally register, when the evaluation value for a stroke candidate is smaller than a predetermined evaluation value which shows a poor match, the stroke information for the stroke candidate as the standard stroke information in said stroke dictionary; and
    a character dictionary additional register unit operable to additionally register a stroke order that includes the stroke candidate for a character to be learned in said character dictionary.

10. The character input apparatus of claim 1, wherein said stroke dictionary stores each of the sets of standard stroke information together with a flag that indicates whether each of the plurality of strokes has a possibility of being a first stroke of a character, and said stroke matching unit compares the stroke information obtained from a first coordinate string outputted by said coordinate output unit only with the stroke information having the flag that indicates a first stroke in said stroke dictionary.

11. The character input apparatus of claim 1, further comprising a coordinate string detecting unit operable to detect coordinate strings, out of the coordinate strings outputted by said coordinate output unit, that are inputted at least a predetermined time after an immediately preceding coordinate string, wherein said stroke dictionary stores each of the sets of standard stroke information together with a flag that indicates whether each of the plurality of strokes has a possibility of being a first stroke of a character, and said stroke matching unit compares stroke information obtained from a first coordinate string outputted by said coordinate output unit only with stroke information having the flag that indicates a first stroke in said stroke dictionary.

12. The character input apparatus of claim 1, wherein said stroke matching unit comprises:
    an overlap detecting unit operable to detect from the coordinate string outputted by said coordinate output unit whether a stroke has a line segment that partially or completely overlaps another stroke preceding the stroke, and
    if said overlap detecting unit detects overlapping strokes, said character detecting unit treats the latter of the overlapping strokes as belonging to a different character than the former stroke.

13. The character input apparatus of claim 1, further comprising,
    an off-stroke information detecting unit operable to detect off-stroke information from an end point of one coordinate string and a start point of a following coordinate string outputted by said coordinate output unit,
    wherein said character dictionary further stores, when a character is composed of a plurality of strokes, off-stroke information that shows a relationship between an end point of one stroke and a start point of a following stroke, and
    wherein when said character detecting unit detects characters from the plurality of stroke candidates outputted by said stroke matching unit, if the off-stroke information detected by said off-stroke information detecting unit differs from the corresponding off-stroke information of a character of the plurality of characters registered in said character dictionary by at least a predetermined amount, said character detecting unit does not detect the character.

14. The character input apparatus of claim 1, wherein said character detecting unit comprises:
    a character candidate detecting unit operable to detect a plurality of character candidates; and
    a shortest character string detecting unit operable to generate character strings by combining the plurality of character candidates detected by said character candidate detecting unit without changing an order of the plurality of character candidates and detect a character string which has a smallest number of characters as the inputted handwritten characters.

15. A character input method comprising:
    a coordinate output operation for outputting, when a user inputs handwritten characters, a coordinate string comprising sets of coordinates of points for each handwritten stroke comprising the handwritten characters;
    a stroke matching operation for obtaining stroke information for each handwritten stroke from the outputted coordinate string of the handwritten stroke, comparing the stroke information with each set of standard stroke information registered in a stroke dictionary, and outputting stroke candidates; and
    a character detecting operation for browsing orders of strokes for characters registered in a character dictionary using an order of a group of the stroke candidates obtained in inputted order in said stroke matching operation as a key and detecting a character whose stroke order matches the order of the stroke candidates.

16. A program stored on a computer-readable storage medium for use with a computer, the computer-readable storage medium also having a stroke dictionary in which sets of standard stroke information for a plurality of strokes are registered, each of the sets of standard stroke information corresponding to a different stroke, and a character dictionary in which stroke orders for a plurality of characters are registered, each of the plurality of stroke orders corresponding to a different character, stored thereon, said program comprising:
    coordinate output program code operable to output, when a user inputs handwritten characters, a coordinate string comprising sets of coordinates of points for each handwritten stroke comprising the handwritten characters;

stroke matching program code operable to obtain stroke information for each handwritten stroke from the outputted coordinate string of the handwritten stroke, compare the stroke information with each of the sets of stroke information registered in the stroke dictionary, and output stroke candidates; and character detecting program code operable to search the character dictionary using an order of a group of the stroke candidates obtained in inputted order by said stroke matching program code as a key, and detect a character whose stroke order matches the order of the stroke candidates.

* * * * *